(12) United States Patent
Honkura et al.

(10) Patent No.: US 7,560,841 B2
(45) Date of Patent: Jul. 14, 2009

(54) THIN HYBRID MAGNETIZATION TYPE RING MAGNET, YOKE-EQUIPPED THIN HYBRID MAGNETIZATION TYPE RING MAGNET, AND BRUSH-LESS MOTOR

(75) Inventors: Yoshinobu Honkura, Aichi-ken (JP); Hiroshi Matsuoka, Aichi-ken (JP); Daisuke Nagaya, Aichi-ken (JP)

(73) Assignee: Aichi Steel Corporation, Ltd., Tokai-shi (JP)

( * ) Notice: Subject to any disclaimer, the term of this patent is extended or adjusted under 35 U.S.C. 154(b) by 0 days.

(21) Appl. No.: 10/545,428

(22) PCT Filed: Jul. 22, 2004

(86) PCT No.: PCT/JP2004/010405

§ 371 (c)(1),
(2), (4) Date: Sep. 26, 2005

(87) PCT Pub. No.: WO2005/008862

PCT Pub. Date: Jan. 27, 2005

(65) Prior Publication Data

US 2006/0113857 A1 Jun. 1, 2006

(30) Foreign Application Priority Data

Jul. 22, 2003 (JP) .............................. 2003-200148

(51) Int. Cl.
*H02K 21/12* (2006.01)
(52) U.S. Cl. .............................. 310/156.43; 310/154.12
(58) Field of Classification Search ..................
310/156.01–156.84, 154.12, 154.21, 154.22, 310/154.28
See application file for complete search history.

(56) References Cited

U.S. PATENT DOCUMENTS 3,694,115 A 9/1972 Steingroever (Continued)

FOREIGN PATENT DOCUMENTS

DE 3913276 A1 10/1990

(Continued)

OTHER PUBLICATIONS

Japanese Office Action dated May 1, 2006.

(Continued)

*Primary Examiner*—Nguyen N Hanh
(74) *Attorney, Agent, or Firm*—McGinn IP Law Group, PLLC

(57) ABSTRACT

The present invention provides miniaturization of brushless motors and brush motors used in electric devices, a ring magnet which simultaneously achieves both high torque and a reduction in cogging torque, a ring magnet with yoke, and a brushless motor. The thin hybrid magnetized ring magnet of the present invention is structured of, in a ring magnet comprised of a plurality of magnetic poles, a radially magnetized main pole and an interface for which the interface of the adjoining main pole is polar anisotropic. When the thin hybrid magnetized ring magnet structured in this manner is applied to a brushless motor, in the case of radial magnetizing, the abrupt change in magnetic flux of the interface between the magnetic poles becomes smooth and cogging torque is greatly reduced due to polar anisotropic magnetization of the interface. At the same time, by polar anisotropically magnetizing the interface between the magnetic poles, magnetic flux is concentrated on the radially magnetized main pole, and in comparison to only radial magnetization, maximum surface magnetic flux improves and it is possible to attain high torque.

13 Claims, 20 Drawing Sheets

U.S. PATENT DOCUMENTS

| | | | |
|---|---|---|---|
| 4,739,203 A * | 4/1988 | Miyao et al. | 310/67 R |
| RE34,229 E * | 4/1993 | Shimizu et al. | 335/302 |
| 6,111,332 A * | 8/2000 | Post | 310/90.5 |
| 6,700,247 B2 * | 3/2004 | Masuzawa et al. | 310/80 |
| 6,858,960 B1 * | 2/2005 | Muszynski | 310/156.47 |
| 6,917,132 B2 * | 7/2005 | Honkura et al. | 310/154.22 |

FOREIGN PATENT DOCUMENTS

| | | |
|---|---|---|
| EP | 1 263 116 | 12/2002 |
| JP | 62-140877 | 9/1987 |
| JP | 6-124822 | 5/1994 |
| JP | 2001-37197 | 2/2001 |
| JP | 2003-9438 | 1/2003 |
| JP | 2003-203818 | 7/2003 |
| JP | 2003-204642 | 7/2003 |
| JP | 2004-56835 | 2/2004 |
| WO | WO 01/43259 A1 | 6/2001 |

OTHER PUBLICATIONS

European Search Report dated Jul. 20, 2007.
Zhu Z Q et al., "Halbach Permanent Magnet Machines and Applications: A Review" IEE Proceedings: Electric Power Applications, Institution of Electrical Engineers, GB, vol. 148, No. 4, Jul. 6, 2001, pp. 299-308, XP006016918.
Japanese Office Action dated Jun. 12, 2007, with partial English-language translation.

* cited by examiner

Conditions: w=2h

Conditions: w=2h

THIN HYBRID MAGNETIZATION TYPE RING MAGNET, YOKE-EQUIPPED THIN HYBRID MAGNETIZATION TYPE RING MAGNET, AND BRUSH-LESS MOTOR

BACKGROUND OF THE INVENTION

1. Field of the Invention

The present invention relates to a magnet used in a brushless motor used in electronic devices, a brush motor rotor or stator; a magnet with yoke; and a motor in which they are used.

2. Description of the Related Art (Patent Reference 1) Japanese Unexamined Patent Application (Kokai) 6-124822

The need for smaller, high performance motors has been increasing in recent years. Small and high-performance brushless motors with high torque as well as low cogging torque are also needed.

Ring magnets used in brushless motors are ordinarily used having been magnetized with a plurality of poles. With respect to alignment and method of magnetization of those magnets, there are radially magnetized ring magnets and polar anisotropically magnetized ring magnets.

In comparison to polar anisotropically magnetized ring magnets, the alignment and magnetization of radially magnetized ring magnets is good, but surface magnetic flux is quite inferior, and because the magnetic flux changes abruptly at the interface between the magnetic poles there is a large amount of cogging torque, which needed to be improved.

On the other hand, in comparison to radially magnetized magnets, surface magnetic flux for polar anisotropically magnetized ring magnets is high, and because the change in magnetic flux at the interface between the magnetic poles is sinusoidal and smooth, magnetic properties are excellent. However, magnet thickness h which is about ½ the width W of one magnetic pole of the surface of a polar anisotropically magnetized ring magnet is made necessary. Therefore, magnet thickness was increased which also made the motor larger.

With respect to radially aligned ring magnets, in order to solve the above mentioned problems with radial anisotropic ring magnets and polar anisotropic ring magnets, as stated in Japanese Unexamined Patent Publication (Kokai) 6-124822, in radial anisotropic ring magnets, isotropic ring magnets are proposed on which are alternately conferred high anisotropic alignment, magnetization and low anisotropic alignment, and magnetization, but although cogging torque decreased, the torque properties were diminished.

In the anisotropic rare earth bonded magnets (particularly NdFeB magnets) among the above-stated ring magnets, compared to other anisotropic magnets requiring alignment, a large aligning magnetic field is necessary. Therefore, even if the wall thickness of the bonded magnet is made ½ the width of one magnetic pole, because sufficient magnetic flux for realizing alignment is distributed along the surface part of the ring-shaped bonded magnet, the inside part of the magnet is not aligned, and the wall thickness is not effectively utilized. That is, there is the problem of an increase in the amount of magnet material necessary for a motor which will generate the same torque. Also, as shown in FIG. 6, when the magnet is formed with a wall thickness thinner than ½ the width of the interval of one magnetic pole, because the aligning magnetic field is formed along the surface adjacent to the magnetic pole interval, orientation of the main magnetic pole is insufficient, and in anisotropic rare earth bonded magnets, realization of magnetization and polar anisotropic alignment in order to draw out motor properties is not seen, and an anisotropic rare earth bonded magnet with polar anisotropic alignment and magnetization is not known.

Thus, in rare earth bonded magnets, only radially aligned magnets could be obtained.

SUMMARY OF THE INVENTION

Problem to be Solved by the Invention

In light of the above-mentioned problems in the conventional technology, the present invention provides a ring magnet which simultaneously achieves miniaturization of brushless motors used in electronic devices, decrease in cogging torque, and increase in torque per unit area of the magnet; a ring magnet with yoke; and brushless motor.

Another object of the present invention is, in ring-shaped anisotropic rare earth bonded magnets and anisotropic rare earth sintered magnets, along with sufficiently realizing alignment and magnetization of the main pole, by also sufficiently realizing alignment in the interval between the main poles, to decrease cogging torque and increase torque properties by smoothly changing the normal magnetization components between the main magnetic poles.

Means for Solving the Problem

The thin hybrid magnetized ring magnet of the present invention (below, 'hybrid magnet') is structured of, in a ring magnet comprised of a plurality of magnetic poles, a radially magnetized main pole and an interface for which the interface of the adjoining main pole is polar anisotropically magnetized. When a thin hybrid magnetized ring magnet structured in this manner is applied in a brushless motor, the abrupt change in magnetic flux of the interface between the magnetic poles in the case of radial magnetization becomes smooth due to polar anisotropic magnetization of the interface, and cogging torque is greatly reduced. At the same time, by polar anisotropically magnetizing the interface between the magnetic poles, magnetic flux density of the radially magnetized main pole is improved, and in comparison to radial magnetizing alone, maximum surface magnetic flux increases, and it is possible to attain increased torque.

Further, with respect to the magnet wall thickness necessary for polar anisotropic magnetization of the interface, it is possible to form the magnetic pole with a much thinner magnet thickness in comparison to the case in which the magnetic poles are formed by polar anisotropically magnetizing all the magnetic poles at the same width.

By doing so, because it is possible to improve the surface magnetic flux per amount of magnet (unit magnetic pole) used, it is possible to realize increased brushless motor torque per amount of magnet (unit magnetic pole) used.

The material used in the present invention may be either ferrite magnet or rare earth magnet, and may be either an isotropic or anisotropic magnet. The material may also be either a sintered magnet or bonded magnet.

As is preferable, by using the present invention for a rare earth magnet, the amount of rare earth elements used, which are expensive and scarce resources, can be greatly reduced.

However, using the present invention for an anisotropic rare earth bonded magnet is extremely effective for being able to provide a magnet in which torque per unit magnet volume is increased and cogging torque is decreased, in a bonded magnet in which only a radially magnetized bonded magnet can be obtained and a polar anisotropically magnetized magnet can not be obtained.

In the case of an anisotropic magnet, to obtain the magnetization pattern magnetized as in the present invention, it is necessary to perform magnetic field alignment by prior application to the molded body of an aligning magnetic field the same as magnetized.

FIG. 1 shows the magnetization pattern (magnetization vector distribution) of hybrid magnet 1 of the present invention. Main pole 11b in the middle of the figure is radially aligned in the direction from the outer periphery towards the inner periphery. Thus, main pole 11b possesses radial anisotropy. Interface 12a, which is the region between main pole 11a and main pole 11b in which the direction of the magnetization vector changes, is located between the two interfaces 111 of the adjacent main poles 11b and 11a, and is polar anisotropically magnetized. Thus, interface 12a possesses polar anisotropy. Magnetic pole boundary 15 is located in the center of interfaces 12a and 12b. As for the magnetization pattern, main pole 11a possesses an S pole on the inner peripheral surface, an N pole on the outer peripheral surface, and is radially aligned in the direction from the inner peripheral surface towards the outer peripheral surface. Interface 12a, right-adjacent to above mentioned main pole 11a, possesses on the outer peripheral surface an N pole to the left of boundary 15 and an S pole to the right of boundary 15, and is polar anisotropically magnetized in an abbreviated semicircle centered around boundary line 151 from the S pole to the N pole. Right-adjacent main pole 11b possesses an N pole on the internal peripheral surface and an S pole on the external peripheral surface, and is radially magnetized in the direction from the external peripheral surface to the internal peripheral surface.

Similarly, interface 12b possesses on the outer peripheral surface an S pole to the left of boundary 15 and an N pole to the right of boundary 15, and is polar anisotropically magnetized in an abbreviated semicircle centered around boundary line 151 from the S pole to the N pole. Also, as shown in FIG. 1, the width w of interface 12b is the width of the external diameter in the peripheral direction between the boundaries 111 which are at both ends of the interface, and the magnet thickness is h. When the ratio of interface width w relative to magnetic thickness h is w/h=2, in the ordinary case of a magnet other than an anisotropic rare-earth bonded magnet (particularly an NdFeB bonded magnet), anisotropic magnetization across the entire width w is possible. In this case, the interface width w is the external diameter because when used in a motor the surface facing an external stator or rotor is on the external peripheral surface. When the internal peripheral surface is made to be a motor magnet facing an internal rotor or stator, width w of the interface is the width of the internal periphery in the peripheral direction. However, it may also be defined with the width on the circumference where it is ½ the magnet thickness. Magnetic pole width W is similarly defined as the width on the external peripheral surface between both ends of boundary 15, the width on the internal peripheral surface, or the width on the peripheral surface which is ½ of the magnet thickness.

FIGS. 14(a), 14(b), and 15 respectively show the relationship between W/h and torque per unit magnet volume, relationship between W/h and the ratio of torque of a motor using the hybrid magnetized magnet of the present invention to the torque of a motor using a radially magnetized magnet, and the relationship between W/h and cogging torque per unit magnet volume. The fixed conditions with respect to FIGS. 14(a), 14(b), and 15 are as follows. Anisotropic rare earth bonded magnets were used for materials. Specifically, Nd—Fe—B anisotropic rare earth bonded magnet 100, used in an embodiment stated later, was used. There are 10 magnetic poles, magnet external diameter is φ 50 mm, there are 9 stator teeth, and thickness is 70 mm. Coil magnetomotive force was set at 150 AT/slot, and as a variable condition, the internal diameter was changed under conditions of w=2h.

FIGS. 16 and 17 respectively show the relationship between w/h and cogging torque, and w/h and torque. The fixed conditions with respect to FIGS. 16 and 17 are as follows. Same as in FIGS. 14 and 15, Nd—Fe—B anisotropic rare earth bonded magnet 100 was used for materials. There are 10 magnetic poles, magnet external diameter is φ 50 mm, there are 9 stator teeth, and thickness is 70 mm. Coil magnetomotive force was set at 150 AT/slot, and as a variable condition, the internal diameter was changed under conditions of W/h=8.

In the present invention, it is desirable for W/h to be greater than 4. W is determined by the magnet diameter and the number of magnetic poles. At less than 4, the magnet needlessly becomes too thick, which is undesirable. As is clear from FIG. 14(a), at greater than 4, in comparison to the case of polar anisotropic alignment (in FIG. 14(a), polar anisotropic alignment is the point at which W/h=2 for the properties having to do with the present invention), it is possible to improve magnet unit volume motor torque by more than 50 percent. On the other hand, when W/h is greater than 20, the part of one magnetic pole occupied by the interface becomes small due to the demands of w/h, and improvement of magnetic flux density in the main pole part, and accordingly improvement of maximum surface magnetic flux, can not be obtained. Because the region occupied by the interface becomes small, the magnetization vectors for magnetization of this part do not smoothly change, and therefore it is not possible to design an adequate reduction in cogging torque. Further, as shown in FIG. 15, when W/h is greater than 20, cogging torque per unit magnet volume is decreased 5% in comparison to a motor using a radially magnetized magnet, showing the superiority of the hybrid magnetized magnet of the present invention.

The above testing conditions were disclosed by way of example, but these relationships between motor torque per unit magnet volume, cogging torque, and W/h; and the relationships between motor torque, cogging torque, and w/h; are not effected only by the above mentioned testing conditions; they are also effected by other discretionary conditions.

In the present invention, it is desirable in the relationship between magnetic pole width W and magnet thickness h for W/h to be greater than 2 and less than 20. When W/h is in this range, the superiority of the hybrid aligned magnet of the present invention, in comparison to the case of using a radially aligned magnet, is obtained with respect to cogging torque and motor torque per unit magnet volume. As shown in FIG. 14(a), when W/h surpasses 2, torque per unit magnet volume is the same or greater than torque of a motor using a radially aligned magnet, showing the superiority of the hybrid magnetized magnet of the present invention. This point is the greatest characteristic of the present invention.

Also, in the hybrid magnet of the invention, as shown in FIG. 1, for the relationship between interface width w and magnet thickness h, it is desirable to structure the magnet with w/h as greater than 1 and less than 4. When the ratio of interface width w to magnet thickness h, w/h, equals 2, it is possible to obtain semicircular ordinary polar anisotropic magnetization of the entire interface.

When w/h is less than 1, the magnet is not polar anisotropically magnetized, and areas of the magnet with a thickness not effectively used for magnetization are generated, which is not desirable. When w/h is greater than 4, because the magnet thickness is too thin in comparison to the width of the interface, magnetic flux due to magnetization exits from the internal peripheral surface to the outside. Therefore, magnetization occurs in the internal peripheral surface of the magnet after magnetization, and properties degrade because the magnetic path length is lengthened. That is, magnetic properties of the interface and magnetic flux density of the main pole decrease, and surface magnetic flux of the main magnetic pole is inadequate. At w/h of greater than 1 and less than 4, in a state in which magnet thickness h is thin, maximum surface magnetic flux improves in comparison to only radial magnetization, and it is possible to specifically attain both high motor torque and decreased cogging torque.

As shown in FIG. 16, when w/h is greater than 1, cogging torque is decreased 20% in comparison to motors using radially magnetized magnets. When w/h is less than 4, torque is greater than the torque in motors using radially magnetized magnets. Thus, when w/h is greater than 1 and less than 4, in comparison to using radially magnetized magnets, the superiority of magnets using the hybrid magnetization of the present invention is shown.

When considering increased motor torque and magnet strength, it is preferable for the thin hybrid magnetized ring magnet of the present invention to be structured of an anisotropic bonded magnet. When using an anisotropic bonded magnet, magnetic field orientation treatment with the magnetization pattern of the present invention is performed prior to magnetic field molding during the ring magnet molding process, and by magnetizing in the same manner afterwards, it is possible to obtain higher surface magnetic flux in comparison to an isotropic bonded magnet, which is suitable for increasing torque. Also, in comparison to sintered ring magnets, the thin hybrid magnetized ring magnet of the present invention will have excellent mountability and strength (resistance to fractures and chipping). Further, it is desirable for the above-mentioned anisotropic ring magnet to be structured of an anisotropic rare earth bonded magnet. When using an anisotropic rare-earth bonded magnet, it is possible to obtain higher surface magnetic flux suitable for increasing torque, in comparison to isotropic rare earth bonded magnets, anisotropic ferrite sintered magnets, and anisotropic ferrite bonded magnets.

It is preferable from the viewpoint of manufacturability of the ring magnet and strength (resistance to fractures and chipping) for the thin hybrid magnetized ring magnet of the present invention to be structured of an isotropic bonded magnet. When using an isotropic bonded magnet, in comparison to an isotropic magnet, it is not necessary to perform magnetic field orientation treatment during the ring magnet molding process, and by subsequently magnetizing with the magnetization pattern of the ring magnet of the present invention, the thin hybrid magnetized ring magnet of the present invention can easily be produced. Also, an isotropic bonded magnet will have excellent mountability and strength (resistance to fractures and chipping) in comparison to a sintered magnet.

It is preferable when considering only high motor torque for the thin hybrid magnetized ring magnet of the present invention to be structured of an anisotropic sintered magnet. When using an anisotropic sintered magnet, if equivalent material, highest surface magnetic flux is obtained in comparison to other magnets, which is suitable for increasing torque. When using an anisotropic rare earth sintered magnet, the highest surface magnetic flux can be obtained, which is suitable for increasing torque.

It is preferable for the thin hybrid magnetized ring magnet of the present invention to have a structure in which, as shown in FIG. 2, the thickness of the above-mentioned radially magnetized main pole increases in the radial direction (concave part 112). By doing so, the distance between surface magnetic poles of the magnet will increase (permeance will increase), and it is possible to improve surface magnetic flux. As a result, with respect to surface magnetic flux distribution in the peripheral direction, the decreased part of the surface magnetic flux of the center of each magnetic pole is raised, and it is possible to increase the maximum surface magnetic flux.

When the thin hybrid magnetized ring magnet of the present invention is used in a motor, it is preferable if in the ring magnet used in the inner rotor, the wall thickness of the above-mentioned radially magnetized main pole is increased only in the direction of the internal diameter. This is because the surface magnetic flux improves by increasing the wall thickness. As when the wall thickness is increased in the direction of the external diameter, by expanding the air gap of the part other than the main magnetic pole there is no fear of a decrease in motor properties.

In the thin hybrid magnetized ring magnet of the present invention, when used in a motor, it is preferable if in the ring magnet used in the outer rotor, the wall thickness of the above-mentioned radially magnetized main pole is increased only in the direction of the outer diameter. This is because the surface magnetic flux improves by increasing the wall thickness. As when the wall thickness is increased in the direction of the internal diameter, by expanding the air gap of the part other than the main magnetic pole there is no fear of a decrease in motor properties.

It is preferable for the thin hybrid magnetized ring magnet with yoke of the present invention to be comprised of, in a ring magnet comprised of a plurality of magnetic poles, a thin hybrid magnetized ring magnet comprising a radially aligned main pole and an interface for which the interface of the adjoining main pole is polar anisotropically magnetized, possessing a yoke which contacts at least one of either the internal face or external face of the said hybrid magnetized ring magnet.

For example, when used in an inner rotor-type brushless motor, as shown in FIG. 3, Yoke 2 may be made to contact the entire internal peripheral surface of hybrid magnet 1. When the thin hybrid magnet using this yoke is used in a motor, the distance between the magnetic poles of the surface facing the stator will increase (permeance will increase), and it is possible to further improve surface magnetic flux of the magnetic poles. In this case, Yoke 2 may have a ring shape or a solid columnar shape.

Further, FIG. 4 shows the case in which the inner peripheral surface of hybrid magnet 1 contacts yoke 2 so that a magnetic connection is made only between the main poles. As shown in FIG. 4, because air gap 22 is established between interface 12 and the facing part, it is possible to more certainly lengthen the distance between magnetic poles (permeance will increase) than in the case of FIG. 3, and it is possible to further improve surface magnetic flux of the magnetic poles. The structure of main magnetic pole 11 of above mentioned hybrid magnet I and yoke 2 can be combined as appropriate.

As shown in FIG. 5, the inner rotor-type brushless motor of the present invention is comprised of cylindrical stator 3, rotor 4 disposed inside the stator, revolving axle 5, said rotor 4 being comprised of rotor core 41 and hybrid magnet 1 which closely fits to the external peripheral surface of rotor core 41. Said hybrid magnet 1 is comprised of a plurality of poles, and moreover comprises a radially magnetized main pole and an interface for which the interface of the adjacent main pole part is polar anisotropically magnetized, forming brushless motor 6.

Due to this structure, it is possible by using a thin hybrid magnetized ring magnet to simultaneously achieve both a decrease in the cogging torque of brushless motor 6 and an increase in torque per unit volume of magnet. It is therefore possible to design for an increase in performance and a decrease in size of the brushless motor. When using a soft magnetic body for rotor core 41 as shown in FIGS. 3 and 4, it is possible to increase the distance between magnetic poles (permeance will increase), and therefore it is possible to further improve the surface magnetic flux of the magnetic poles. Also, when convex part 112 is formed with the thickness of the main pole increased in the direction of the inner periphery, surface magnetic flux further improves.

The outer-type brushless motor of the present invention is not shown in the figures, but opposite to FIG. 5, it is comprised of a cylindrical rotor, a stator disposed inside the rotor, and a revolving axle, said brushless motor having a ring magnet wherein the said rotor closely fits to the rotor yoke and the inside peripheral surface of the rotor yoke, the said ring magnet comprising a plurality of poles, and moreover comprising a radially magnetized main pole and an interface for which the interface of the adjacent main pole part is polar anisotropically magnetized.

Due to this structure, it is possible by using a thin hybrid magnetized ring magnet to simultaneously achieve both a decrease in the cogging torque of the brushless motor and an increase in torque per unit volume of magnet. It is therefore possible to design for an increase in performance and a decrease in size of the motor. And in the case of an outer rotor-type motor, by using a soft magnetic body in the rotor yoke, same as the method described above for the inner rotor-type motor, it is possible to lengthen the distance between magnetic poles (permeance will increase), and therefore it is possible to further improve the surface magnetic flux of the magnetic poles.

BRIEF DESCRIPTION OF THE DRAWINGS

FIG. 14(*b*) is a characteristic lines view showing the relationship between W/h and the ratio of torque per unit magnet volume of the hybrid magnet of the present invention and a radial anisotropic magnet.

DETAILED DESCRIPTION OF THE PREFERRED EMBODIMENTS

The present invention is explained below through the use of embodiments. However, the present invention is not limited to the embodiments stated hereafter.

Figure 1:
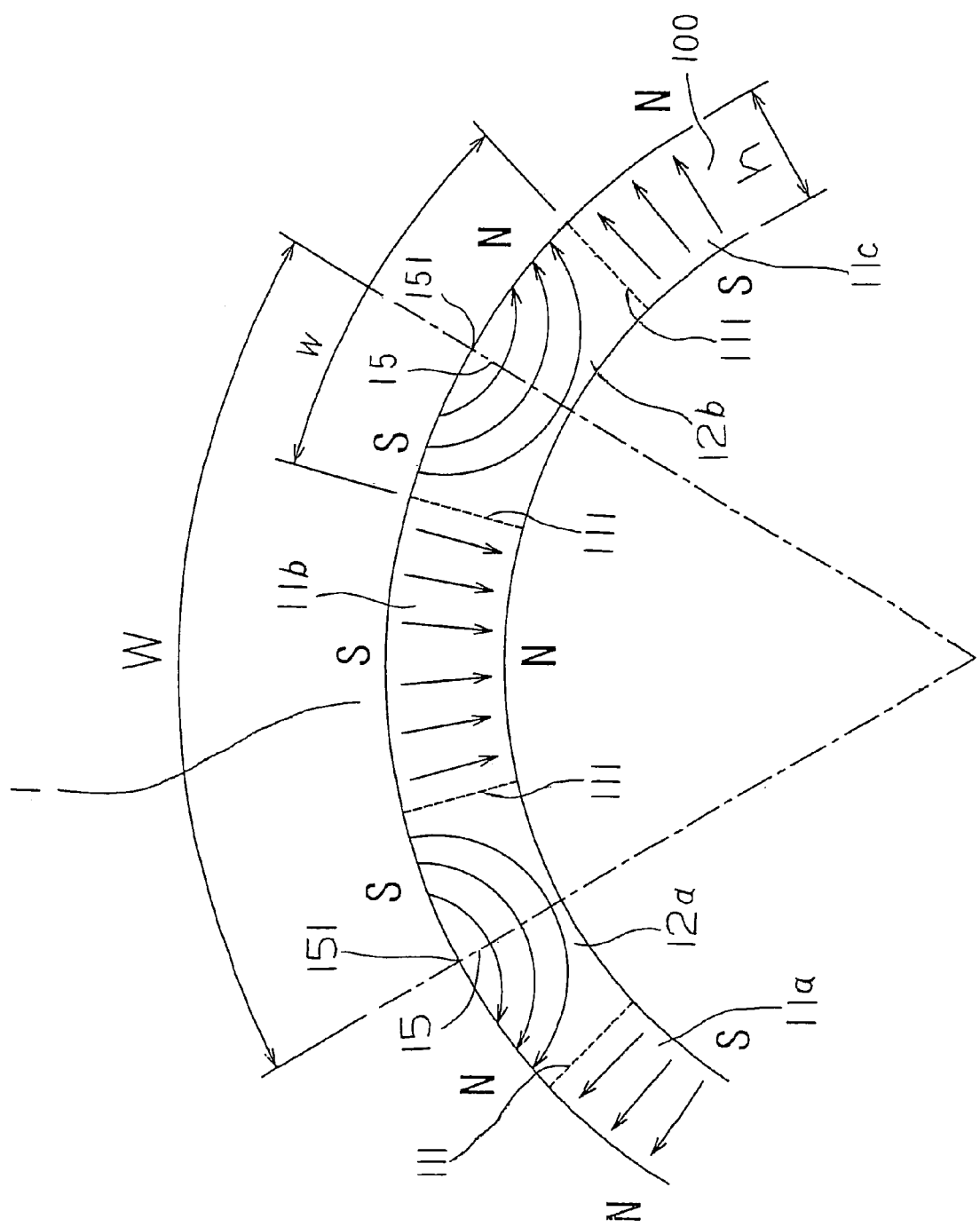
FIG. 1 is a cross sectional view of thin hybrid magnetized ring magnet showing the magnetization pattern (magnetization vector distribution) of the present invention.

The hybrid magnet structure having to do with a specific embodiment of the present invention is shown in. FIG. 1. Hybrid magnet 1 has a ring shape centered around the axis. FIG. 1 shows a magnetic pole and its vicinity in a cross sectional diagram perpendicular to the axis of hybrid magnet 1 of the embodiment. By way of example, Nd—Fe—B anisotropic rare earth bonded magnet 100 is used in hybrid magnet 1.

The arrows within hybrid magnet 1 indicate the magnetization pattern of the magnet interior.

Because the present embodiment is an anisotropic bonded magnet, magnetic field alignment is performed before magnetization, and the alignment pattern is the same as in FIG. 1. Hybrid magnet 1 of the present embodiment has 10 magnetic poles. The magnetization pattern was described above and is therefore omitted from the present explanation.

Hybrid magnet 1 has outer diameter 50 mm and inner diameter 45 mm, thus, thickness h is 2.5 mm. Height h is 65 mm. The outer periphery of hybrid magnet 1 is 157 mm, and because there are 10 magnetic poles, magnetic pole width W is 15.7 mm. The width w of interface 12 is formed at 5.0 mm, twice the magnet thickness h of 2.5 mm. Thus, the value of W/h is 6.3, included within 4 or more and 20 or less, and the value of w/h is 2, satisfying the range of 1 or more and 4 or less.

Other hybrid magnet 1A has outer diameter 44.2 mm and inner diameter 40.2 mm, thus, thickness h is 2.0 mm. Height L is 17.5 mm. The outer periphery of hybrid magnet 1 is 139 mm, and because there are 8 magnetic poles, magnetic pole width W is 17.4 mm. The width w of interface 12 is formed at 4.0 mm, twice the magnet thickness h of 2.0 mm. Thus, the value of W/h is 8.7, included within 8 or more and 20 or less, and the value of w/h is 2, satisfying the range of 1 or more and 4 or less.

The properties for hybrid magnet 1 used an anisotropic rare earth bonded magnet with maximum magnetic energy product of 184 kJ/m$^3$.

The raw materials used in hybrid magnet 1 are comprised of 78.4 wt % Nd magnet powder, 19.6 wt % Sm magnet powder, and 2.0 wt % epoxy resin. For the magnet molding method and magnetic field alignment method, magnetic field alignment was performed by heated magnetic field molding after heat kneading the above magnet powder and resin, and by magnetizing thereafter it was possible to obtain the above mentioned high performance anisotropic rare earth bonded magnet.

These publicly known methods of molding, magnetic field alignment, and magnetization can be used as appropriate. The composition of Nd magnet powder used was an Nd—Fe—B—Ga—Nb alloy with average particle diameter about 100 μm, and the composition of Sm magnet powder used was Sm2Fe17Nx(X≈3) with an average particle diameter of about 3 μm.

Figure 8:
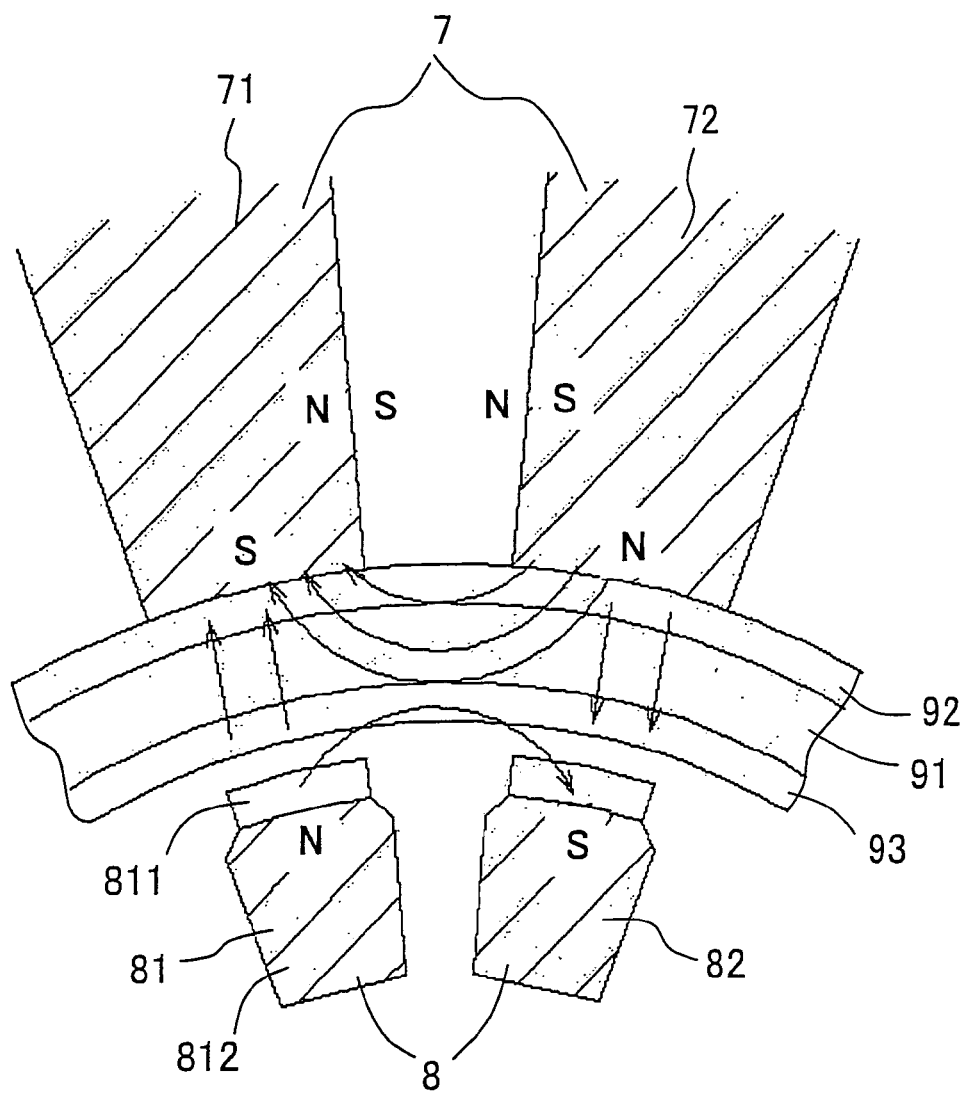
FIG. 8 is a cross sectional diagram of the magnetic field alignment and die when magnetized of the thin hybrid magnetized ring magnet of the present invention.

To obtain the aligning magnetic field and magnetizing magnetic field necessary to obtain the magnetization pattern as shown in FIG. 1 in the above anisotropic rare earth bonded magnet 100, the alignment and magnetization methods shown in FIG. 8 can be implemented. However, these alignment and magnetization methods are not publicly known, and because this technology is difficult to conceive, comparison is performed here with publicly known technology.

Figure 6:
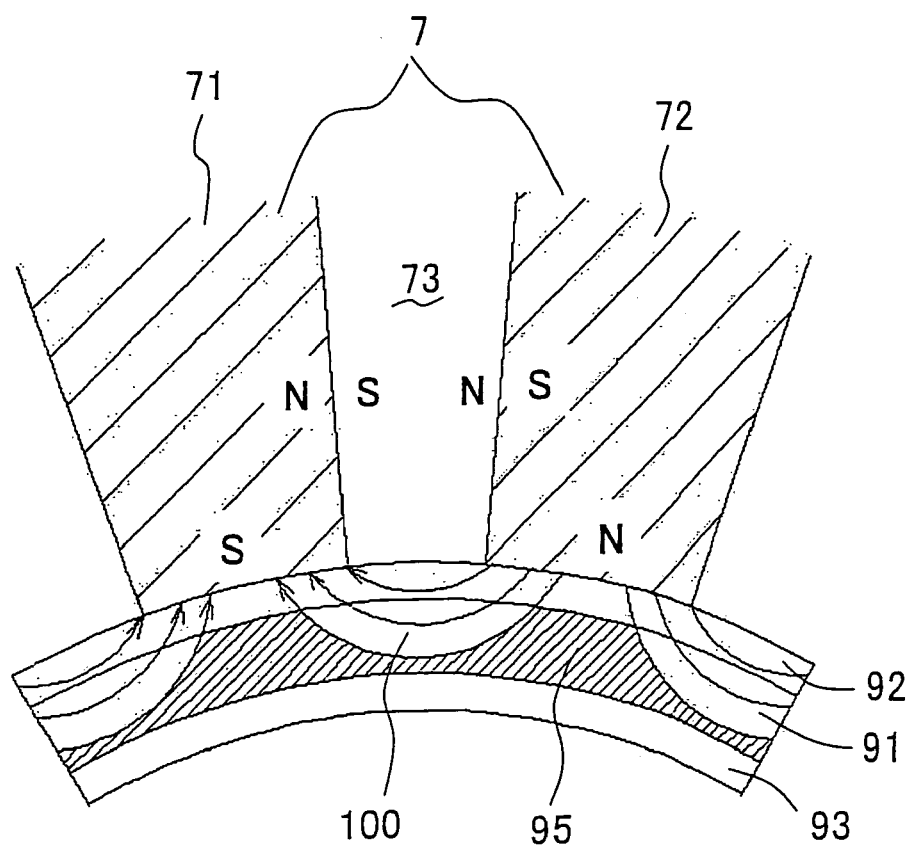
FIG. 6 is a cross sectional view of the magnetic field alignment and die when magnetized of a conventional ring magnet.
Figure 7:
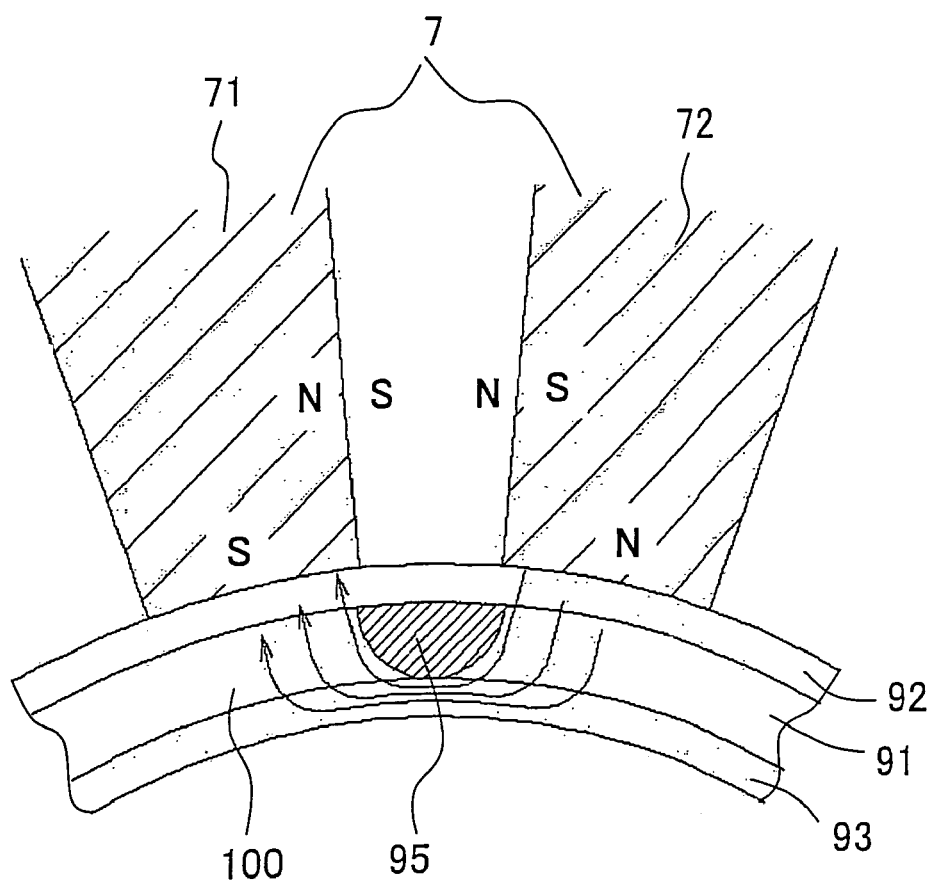
FIG. 7 is a cross sectional view of the magnetic field alignment and die when magnetized of a conventional ring magnet.

FIGS. 6 and 7 explain the instance of applying conventional alignment and magnetization methods to anisotropic rare earth bonded magnet 100, and testing the magnetic alignment and magnetization of the hybrid magnet of the present invention.

FIG. 6 is a cross sectional view of the die used for magnetization and alignment in the direction perpendicular to the axis when magnetizing ring magnet a. This figure shows, expanding the area of alignment and magnetization for one pole of ring magnet a, the magnet alignment and magnetization method. In the direction perpendicular to the axis of ring magnet a, adjacent magnetic field origin 7 is arranged on the side opposing the external peripheral surface. Nib 92, comprised of cylindrical-shaped non-magnetic material, is provided on the outside of cavity 91, and ring core 93, comprised of non-magnetic material, is also provided on the inside of cavity 91. In ring-shaped cavity 91, formed in the space between the internal wall of nib 92 and the internal wall of ring core 93, bonded magnet material composed of magnet powder and resin powder is mainly provided.

In this case, in the space of the adjacent magnetic field origin, the gap formed by non-magnetic material (including air) is increased, and in the magnetic pole interval of both magnetic fields an abbreviated semicircular aligning magnetic field is formed as shown in FIG. 6. As a result, a polar anisotropic aligning magnetic field and polar anisotropic magnetizing magnetic field are formed from magnetic field origin 72 towards magnetic field origin 71. (In this case the magnetic pole of magnetic field origin 71 is an S pole, and the magnetic pole of magnetic field origin 71 is an N pole.)

However, in the case of this alignment method, in the part close to the outer periphery of cavity 91, magnetic flux distribution is unevenly distributed on the side where the two magnetic field origins 71 and 72 are facing, and the magnetic flux density which passes through the inner periphery of cavity 91 and the center of the two magnetic field origins 71 and 72 is reduced. Accordingly, in the center of magnetic field origin 7, from the outer periphery to the inner periphery, at the part of the interface close to the internal peripheral surface, part 95 is formed in which the aligning magnetic field is not sufficiently delivered. This causes a large aligning magnetic field to be necessary in the case of a rare earth anisotropic bonded magnet. Thus, because there is no magnetic field alignment of that part 95, the magnet becomes an isotropic bonded magnet after the subsequent magnetization. Ring magnets which are magnetic field aligned with this method and then magnetized with the same method will have a main magnetic pole with greatly reduced surface magnetic flux.

The magnetic field origins in this case are comprised of a soft magnetic body. Rare earth sintered magnet 73 is provided between the magnetic field origins, which have a magnetic circuit structure with the S pole on the left side of the page space and N pole on the right side of the page space.

The magnetic circuit structure used with respect to magnetic field origin 7 is the same in FIG. 7 and FIG. 8 as well.

FIG. 7 shows the case of changing ring core 93 inside cavity 91 from non-magnetic material to soft magnetic material, from the alignment and magnetization methods shown in FIG. 6. In this case, as shown in FIG. 7, because soft magnetic material ring core 93 is arranged at the front of magnetic field origin 72 within adjoining magnetic field origin 7, the aligning magnetic field flows in perpendicularly relative to the ring core, and after subsequently passing through the inside of the ring core, again perpendicularly flows into magnetic field origin 71. Therefore, the main pole is adequately radially aligned, and an aligning magnetic field is for the most part not provided.

Thus, when the magnet is similarly magnetized afterwards, surface magnetic flux at the interface greatly decreases. As a result, it is not possible to design for decreased cogging torque and increased torque in the motor.

One example of the alignment and magnetization methods of hybrid magnet 1 of the present invention is shown in FIG. 8, but the alignment and magnetization methods are not limited to those in this figure.

The alignment and magnetization methods of hybrid magnet 1 of the present invention, in addition to the alignment and magnetization methods shown in FIG. 6, are arranged in the direction opposing magnetic field origin 8 which has a magnetic pole with polarity opposite to the magnetic pole of magnetic field origin 7 inside non-magnetic ring core 93. As for the arrangement of magnetic poles, the magnetic pole of magnetic field origin 71 is an S pole, the magnetic pole of magnetic field origin 72 is an N pole, the magnetic pole of magnetic field origin 81 is an N pole, and the magnetic pole of magnetic field origin 82 is an S pole. In this case, between the adjoining magnetic field origins supplied by magnetic field origin 7, the space formed by non-magnetic material (including air) is increased, and between the magnetic poles of both magnetic fields an abbreviated semicircular aligning magnetic field as shown in FIG. 8 is formed. Further, the aligning magnetic field of magnetic field origin 8 is set up to be weak in comparison to magnetic field origin 7. Magnetic field origin 8 is structured of yoke 811 and rare earth sintered magnet 812.

As a result, in the main pole corresponding region of hybrid magnet 1, because the polarity differs between opposing magnetic field origins, multiple parts are provided among the aggregate of aligning magnetic fields from both magnetic field origins, from magnetic field origin 72 towards magnetic field origin 82, or from magnetic field origin 81 towards magnetic field origin 71. Therefore, in comparison to the case in which there is no magnetic field origin 8, the main pole corresponding region is adequately radially aligned.

On the other hand, in interface 12 of hybrid magnet 1, a polar anisotropic aligning magnetic field is formed from magnetic field origin 72 towards magnetic field origin 71. Also, an aligning magnetic field is formed from magnetic field origin 81 towards magnetic field origin 82. However, because the magnetic field of magnetic field origin 8 is weakened in comparison to magnetic field origin 7, in interface 12, as shown in cavity 91 in the center of the figure, the polar anisotropic aligning magnetic field in the direction from aligning magnetic field origin 72 to aligning magnetic field origin 71 is completely covered, and interface 12 is adequately polar anisotropically aligned. Conversely, because the magnetic field from magnetic field origin 81 to magnetic field origin 82 is weak, no influence is exerted on cavity 91. The very same procedure is performed in the case of magnetization as well, increasing magnetic field strength.

Doing so, it is possible to perform magnetic field orientation and magnetization of anisotropic rare earth bonded magnet 100 of the embodiment.

Of course, when using an isotropic magnet, magnetic field alignment is unnecessary, and it is fine to perform only the magnetization process.

Figure 3:
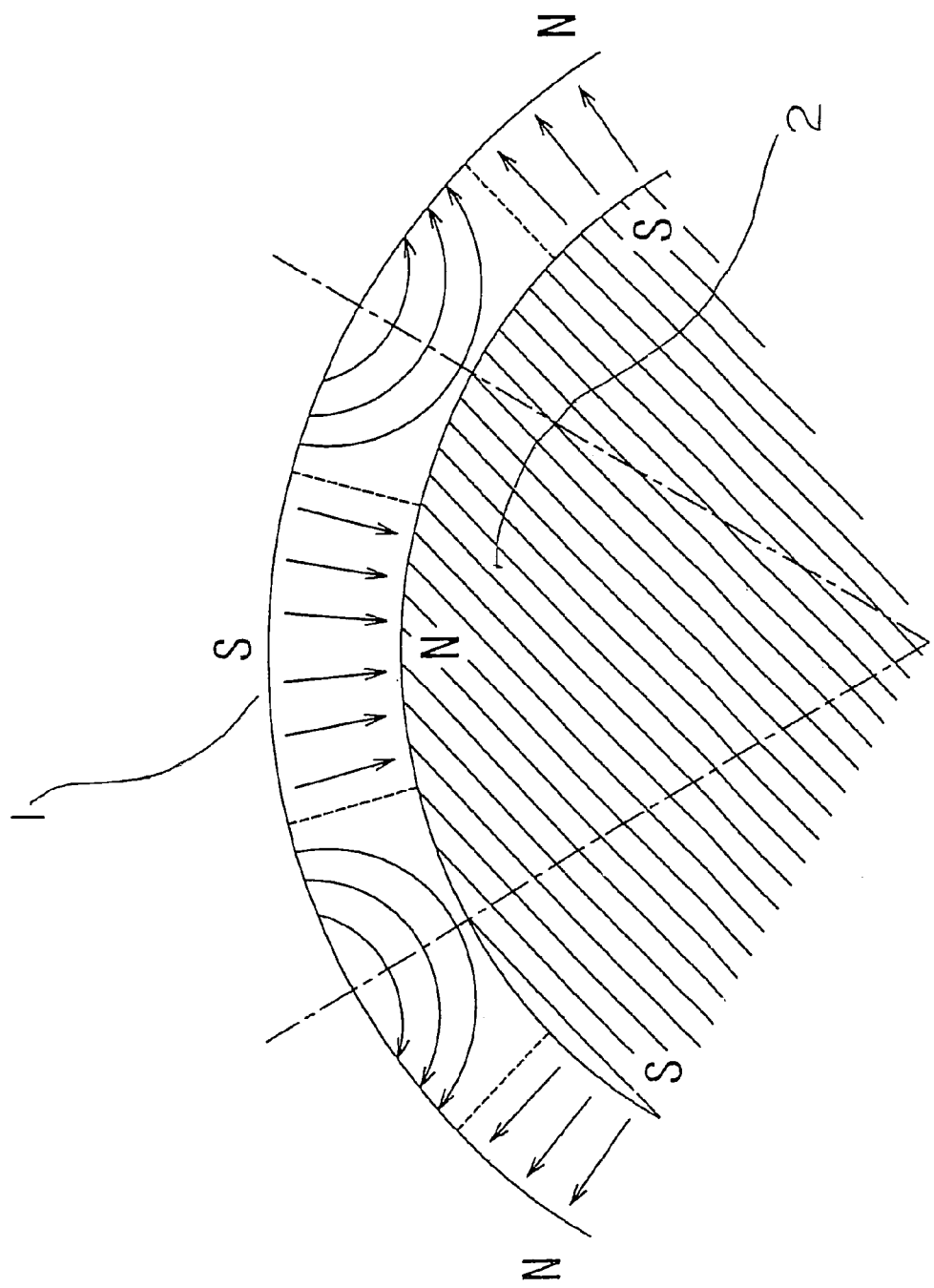
FIG. 3 is a cross sectional view of the thin hybrid magnetized ring magnet of the present invention with the yoke contacting the internal peripheral surface of the ring magnet.
Figure 4:
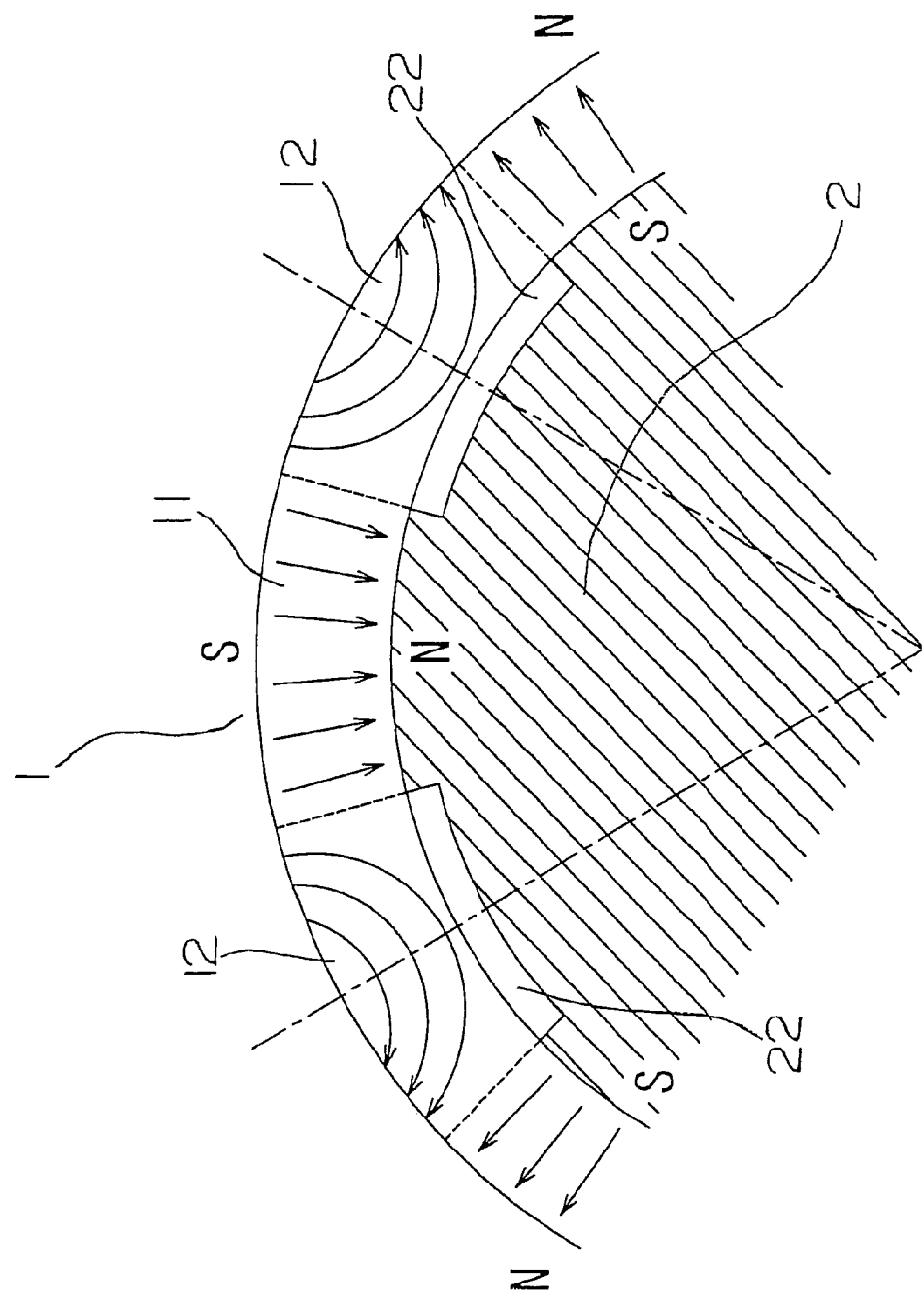
FIG. 4 is a cross sectional diagram of a thin hybrid magnetized ring magnet in which, in a state in which a yoke is contacting the inner surface of the ring magnet of the present invention, an air gap is established in the part facing the interface.
Figure 9:
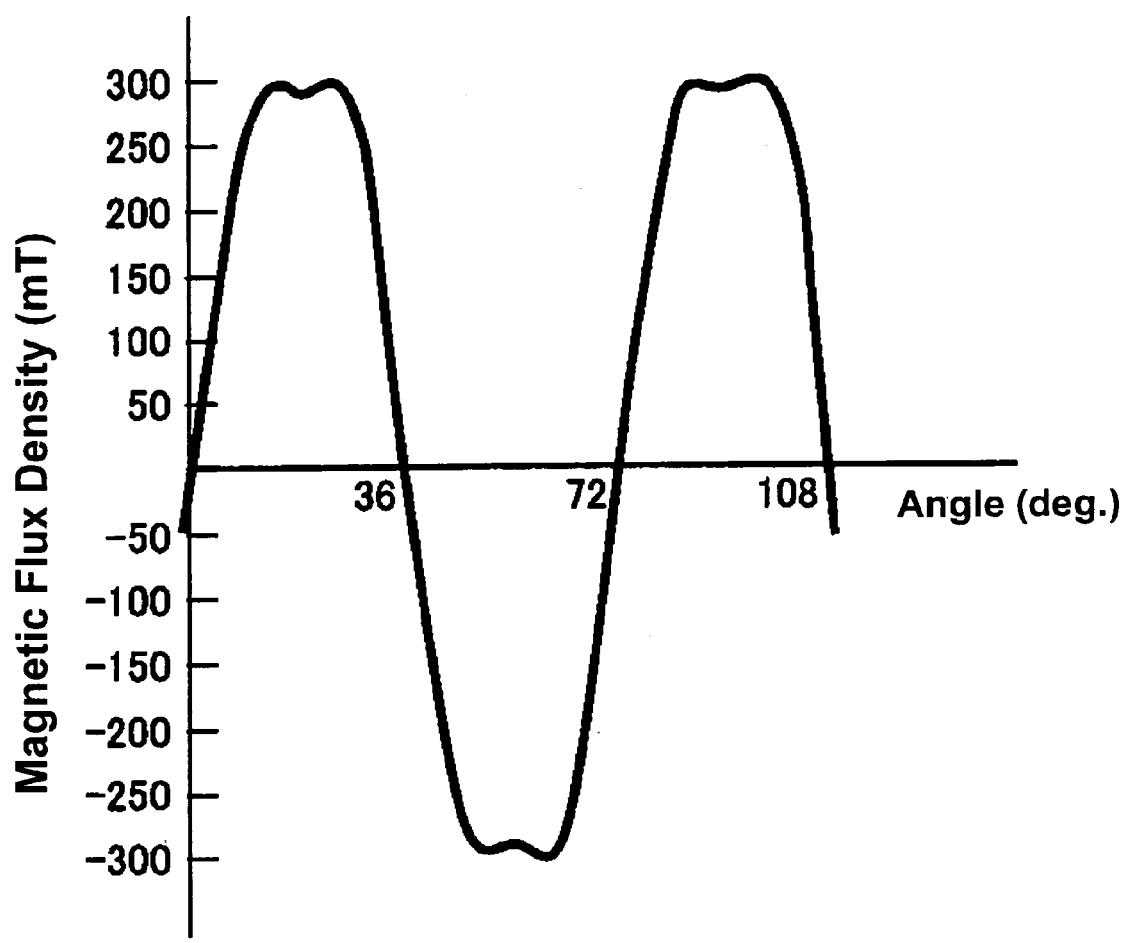
FIG. 9 is a surface magnetic flux distribution diagram of embodiment A of the thin hybrid magnetized ring magnet of the present invention.
Figure 18:
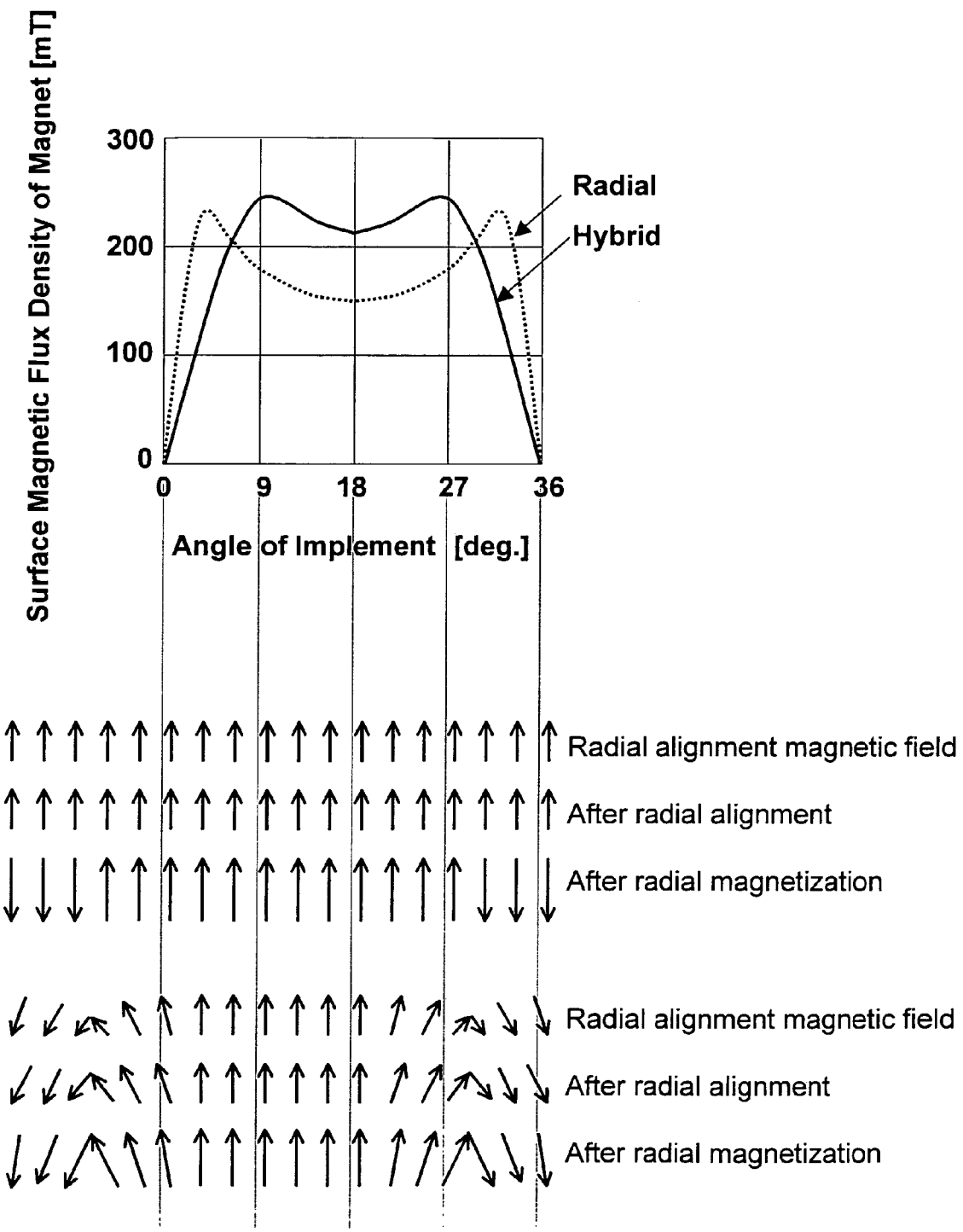
FIG. 18 is a characteristic lines view showing the surface magnetic flux density distribution and magnetization vectors and the aligning magnetic field vectors of the anisotropic rare earth bonded magnet for a specific embodiment of the present invention.
Figure 19:
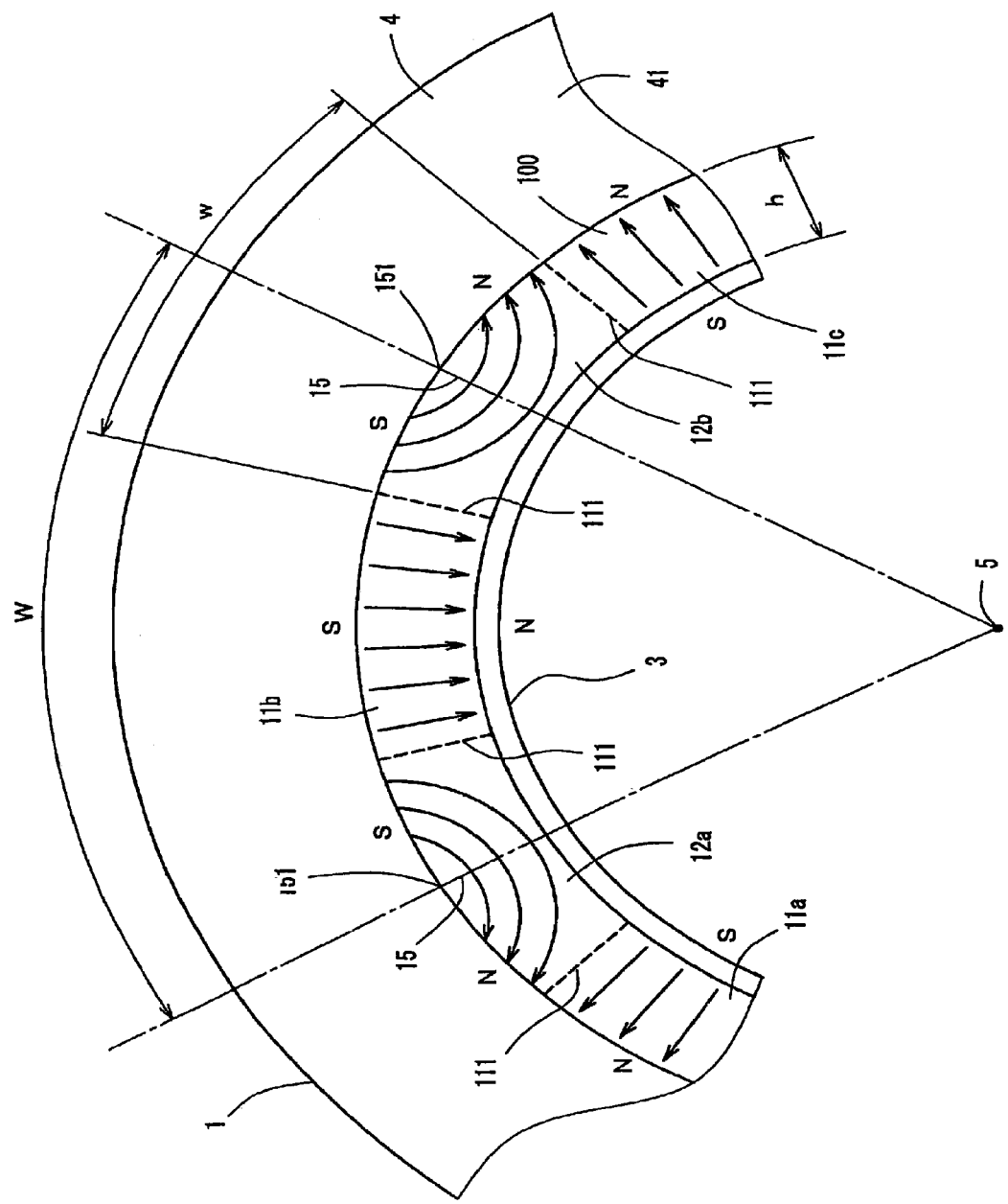
FIG. 19 is a cross sectional view of a thin hybrid magnetized ring magnet showing the magnetization pattern (magnetization vector distribution) of an exemplary embodiment of the present invention.
Figure 20:
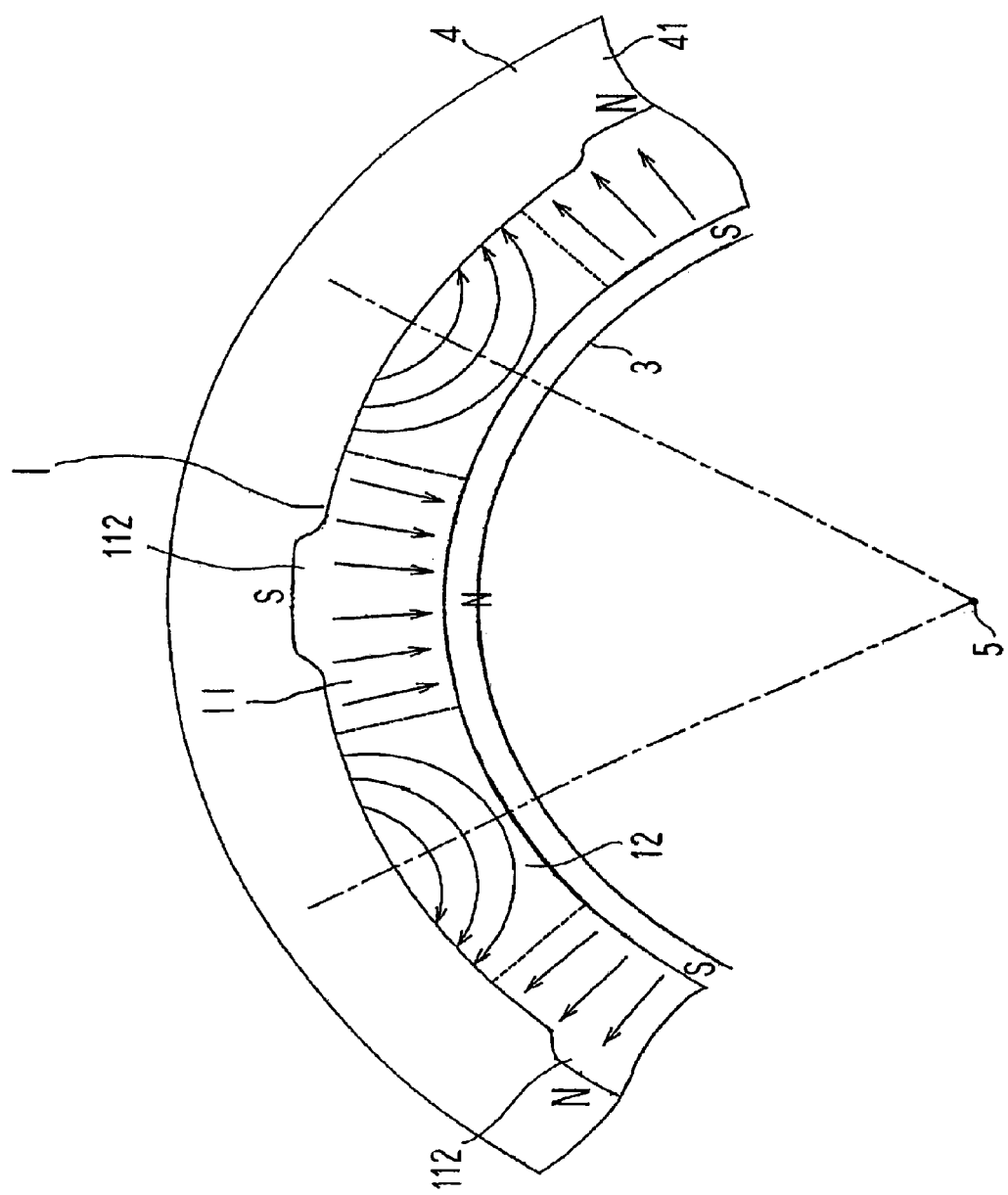
FIG. 20 is a cross sectional view of a thin hybrid magnetized ring magnet showing the magnetization pattern (magnetization vector distribution) of an exemplary embodiment of the present invention.

Here the surface magnetic flux effect of the normalization method in the cross sectional view perpendicular to the axis of hybrid magnet 1 of the present invention is shown. The material used is previously stated anisotropic rare earth bonded magnet 100 with maximum magnetic energy product of 184 kJ/m3. In embodiment A, hybrid magnet 1 with yoke was used as shown in FIG. 3. The alignment and magnetization elements are shown with vectors as in FIG. 3. at The interface is polar anisotropically aligned along a semicircular shape and magnetized, and the main pole is radially aligned and magnetized. The alignment and magnetization elements of the present embodiment are shown in FIG. 18 compared to elements of radial alignment and magnetization. This figure uses waveforms of the surface magnetic flux distribution diagram of embodiment A of the thin hybrid magnetized ring magnet of the present invention shown in FIG. 9, and the surface magnetic flux distribution diagram of comparison example 1 of the conventional radial anisotropic ring magnet. With radial alignment, the alignment direction is constant across the range of all angles; for example, pointing in the normalized direction of the outer peripheral surface. In this aligned magnet, magnetization is performed so that the direction of magnetization for each main pole is inverted. Therefore, the direction of magnetization abruptly changes at the border of the adjoining main pole. Conversely, with the hybrid alignment and magnetization of the present invention, with respect to the interface between main poles (in the figures, the range from 0-9 degrees and 27-36 degrees), polar anisotropic magnetization is realized in which the alignment direction gradually changes along with angle of rotation and inverts. And by further magnetizing, polar anisotropic magnetization at the interface is completed, with a distribution in which the direction of the magnetization vectors gradually changes and inverts. On the other hand, at the main pole (in the figures, the range from 9-27 degrees), radial alignment in the normalized direction of the outer periphery of the ring magnet and magnetization is realized. In this manner magnetization and alignment with two types of distribution are performed in the present invention, and therefore the terms hybrid alignment and hybrid magnetization are used. Due to this hybrid alignment and magnetization, it is possible to realize an increase in motor torque and a decrease in cogging torque. FIG. 9 shows the surface magnetic flux distribution of the present invention. The surface magnetic flux density was automatically measured by rotating a magnetized hybrid magnet with attached yoke around a thrust axis, and fitting a hall sensor to a cross-section perpendicular to the thrust axis.

Figure 2:
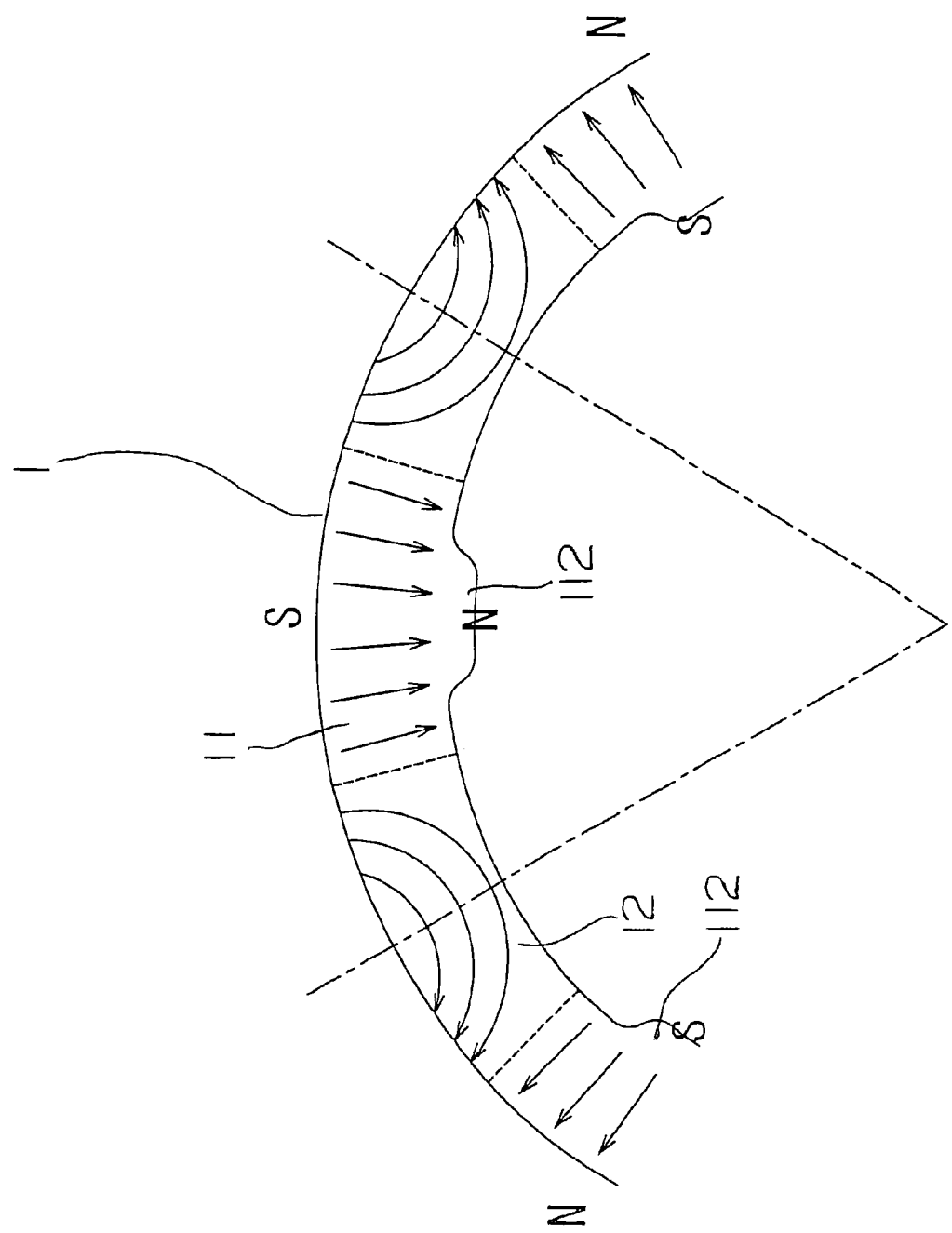
FIG. 2 is a cross sectional view of the thin hybrid magnetized ring magnet of the present invention with the main pole having thickness increased in the radial direction.
Figure 10:
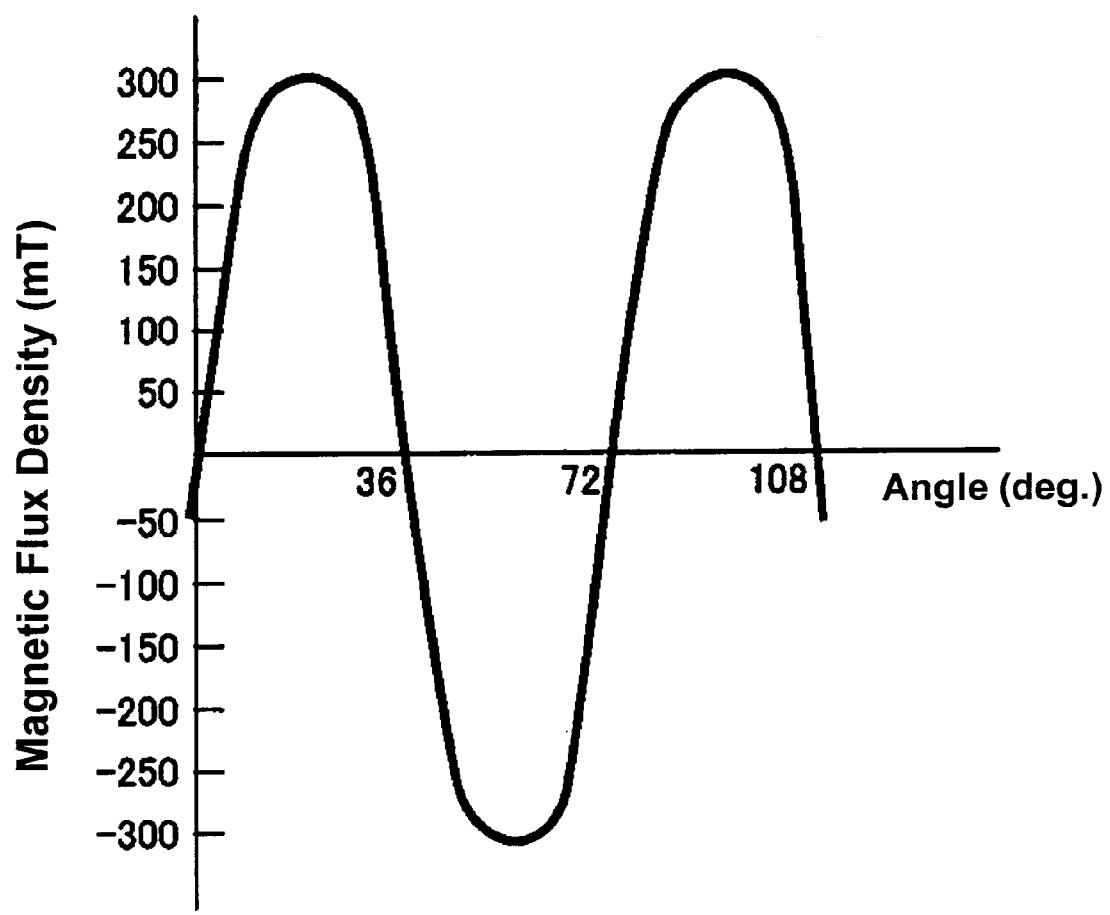
FIG. 10 is a surface magnetic flux distribution diagram of embodiment B of the thin hybrid magnetized ring magnet of the present invention.
Figure 11:
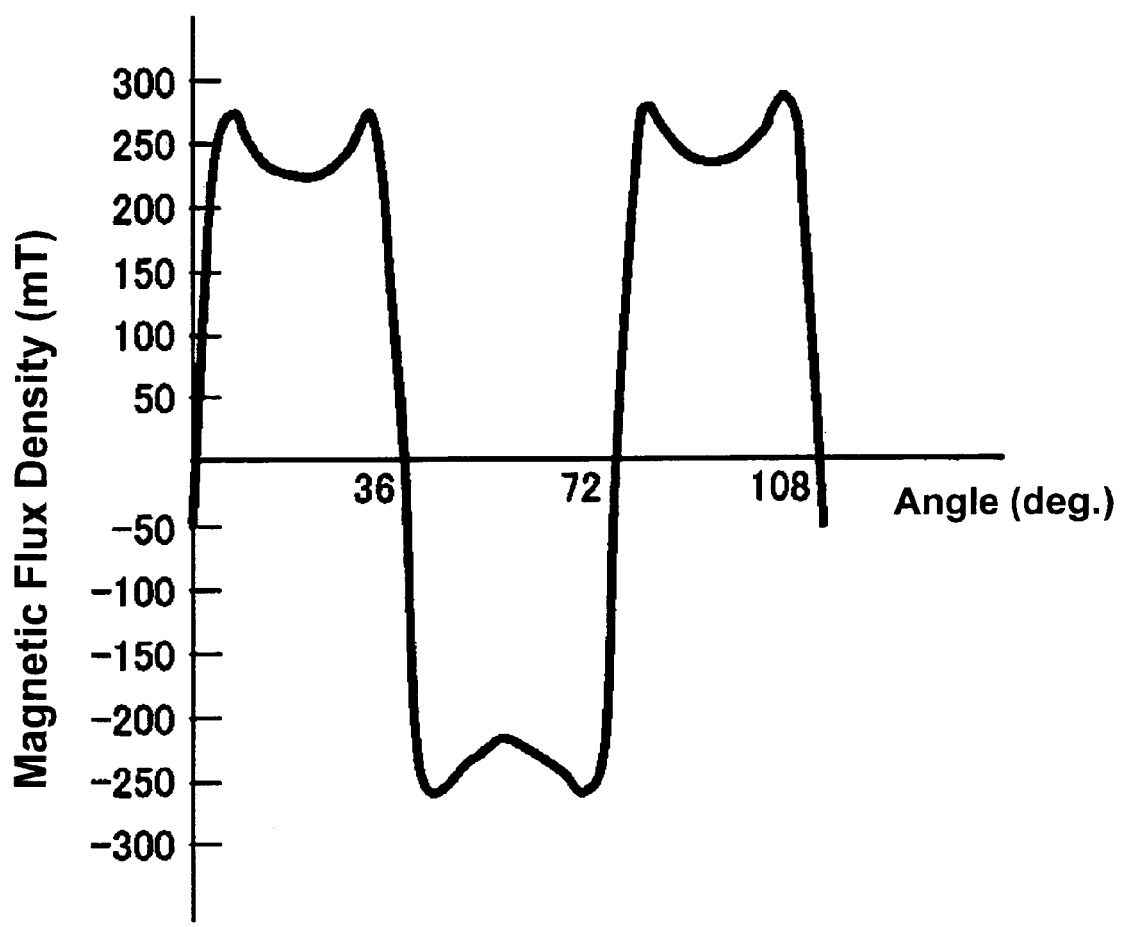
FIG. 11 is a surface magnetic flux distribution diagram of conventional radial anisotropic ring magnet comparison example 1.

As shown in FIG. 2, in embodiment B the thickness of main pole of hybrid magnet 1 is increased, and as shown in FIG. 3, adopts a structure in which a yoke is possessed inside the ring. This surface magnetic flux distribution is shown in FIG. 10. A columnar yoke is used in these embodiments A and B, but is also possible to use a cylindrical yoke for the sake of lighter weight.

Figure 12:
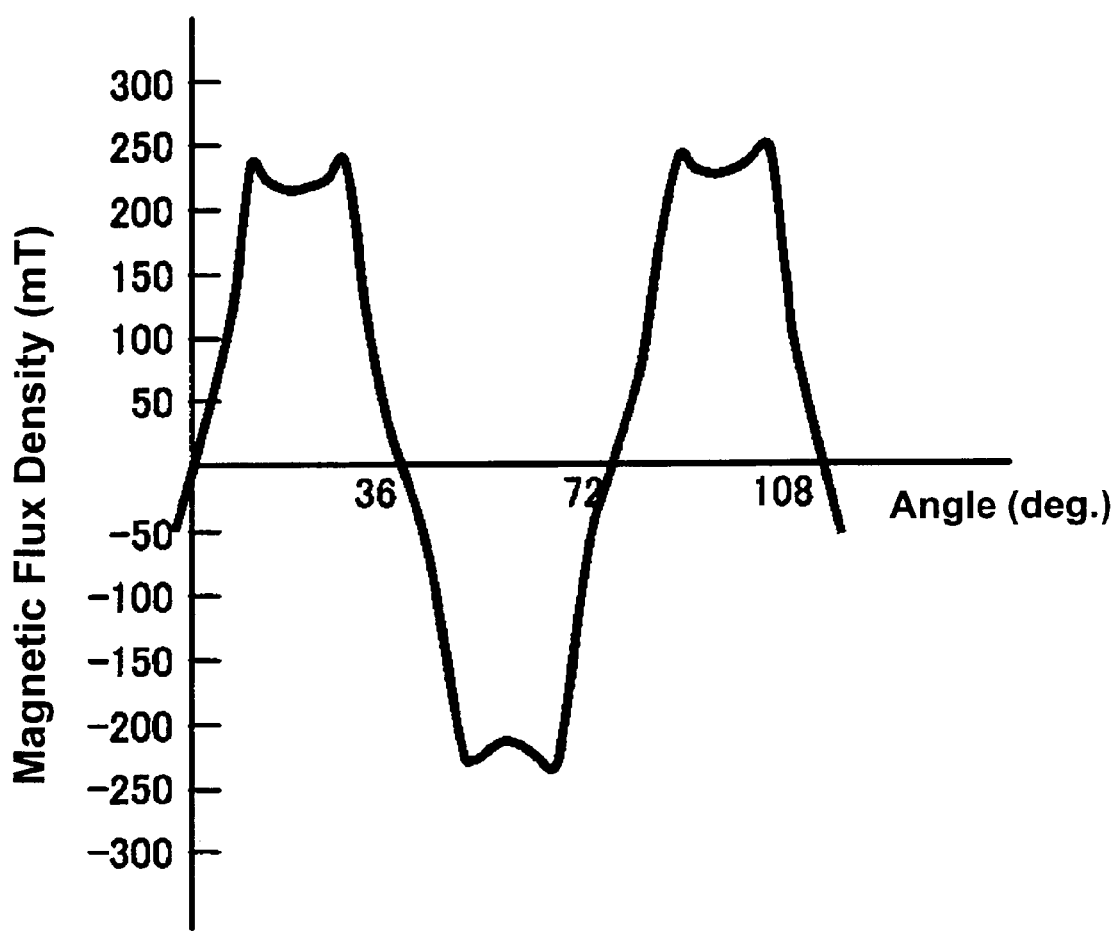
FIG. 12 is a surface magnetic flux distribution diagram of conventional improved radial anisotropic ring magnet comparison example 2.

As comparison example 1, the results of measuring the surface magnetic flux distribution of a magnet which was radially aligned, magnetized, and has the same materials, same dimensions, and same magnetic pole width W as the ring magnet of the present embodiment are shown. Comparison example 2 is an anisotropic rare earth bonded magnet, having low radial alignment and magnetization corresponding to the method disclosed in Japanese Unexamined Patent Application (Kokai) 6-124822, with the main pole corresponding to embodiment A radially aligned and magnetized, and the interface corresponding to embodiment A neither polar anisotropically aligned or polar anisotropically magnetized. The surface magnetic flux distribution of this ring magnet is shown in FIG. 12. The horizontal axis in FIGS. 9 through 12 is implement angle (θ), and the vertical axis is surface magnetic flux (mT). For both comparison examples 1 and 2, a columnar back yoke was inserted into the ring magnet.

Figure 13:
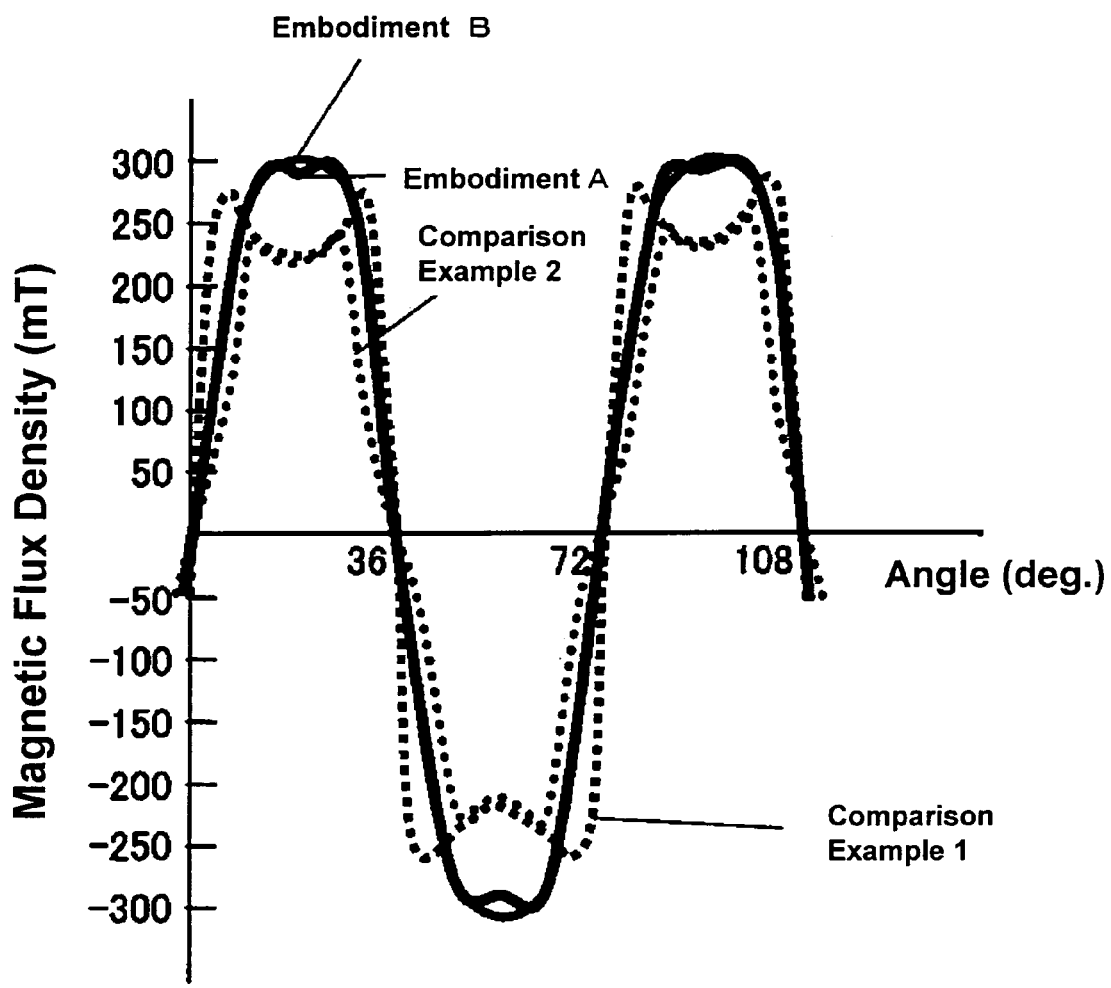
FIG. 13 is a surface magnetic flux distribution diagram combining FIGS. 9 through 12.
Figure 14A:
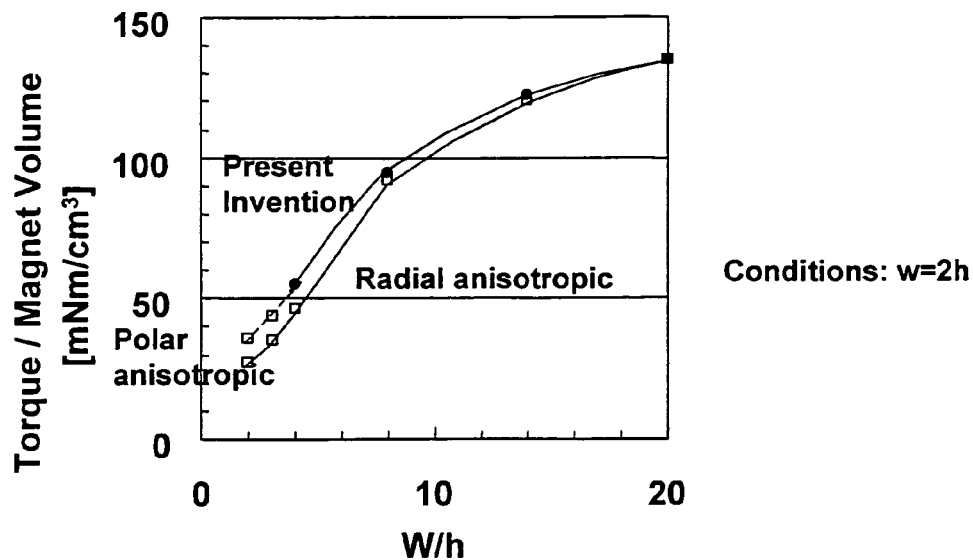
FIG. 14(*a*) is a characteristic lines view showing W/h relative to torque per unit magnet volume of anisotropic rare earth bonded magnet for a specific embodiment of the present invention.
Figure 14B:
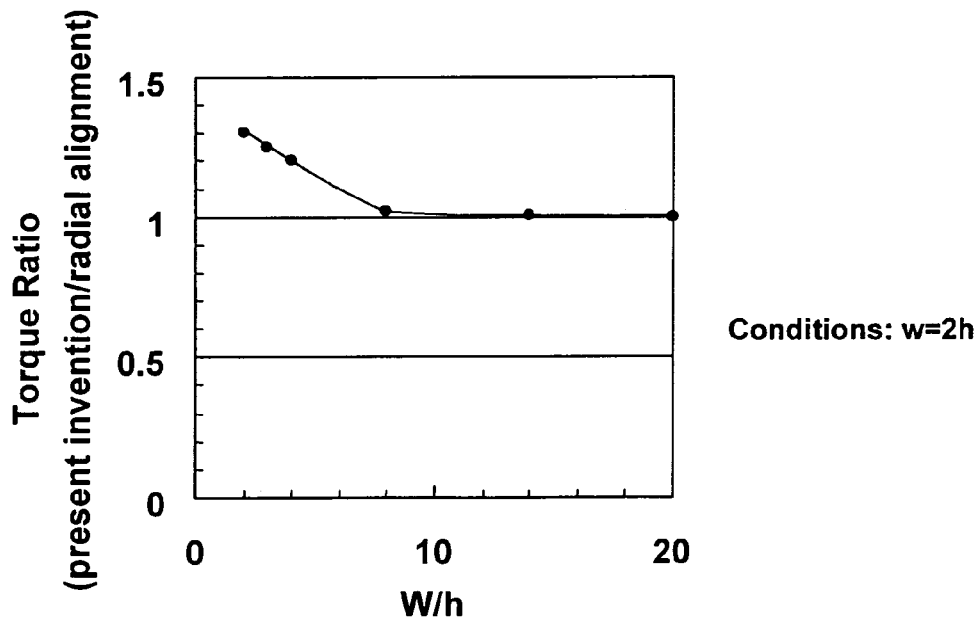
Figure 15:
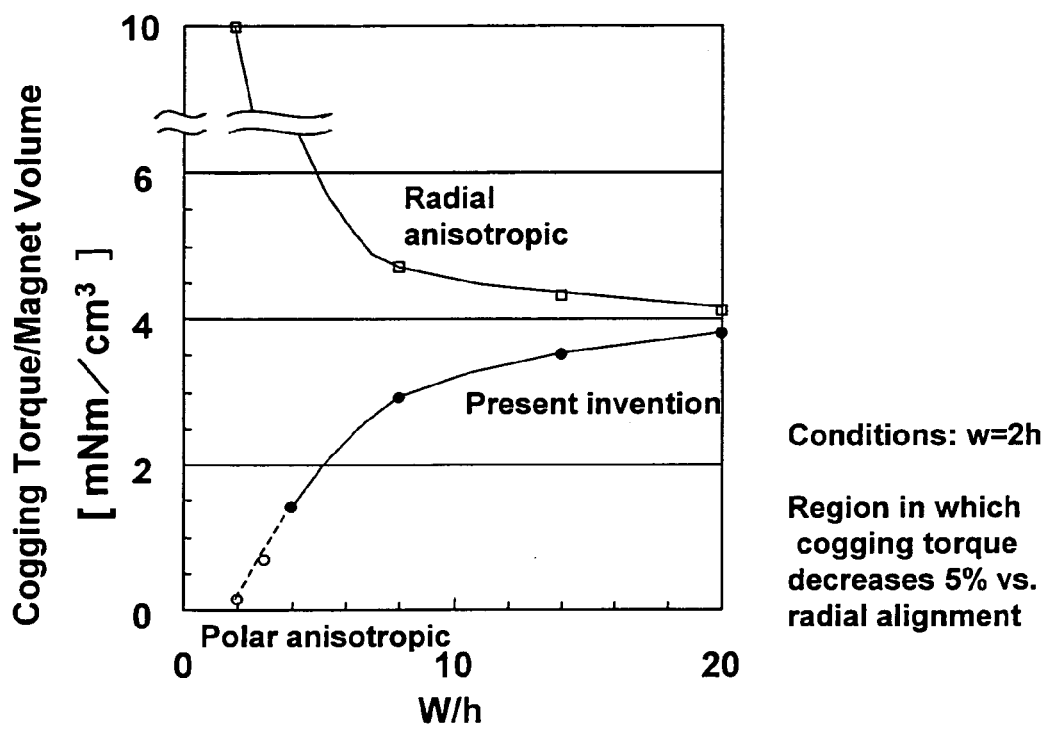
FIG. 15 is a characteristic lines view showing W/h relative to cogging torque per unit magnet volume of anisotropic rare earth bonded magnet for a specific embodiment of the present invention.
Figure 16:
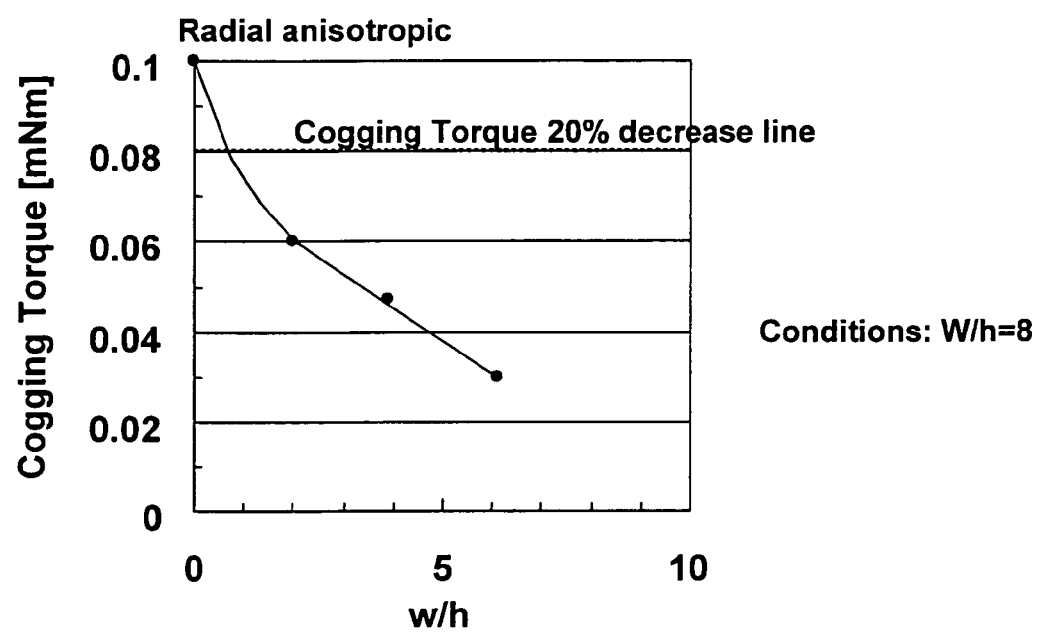
FIG. 16 is a characteristic lines view showing w/h relative to cogging torque of the anisotropic rare earth bonded magnet for a specific embodiment of the present invention.
Figure 17:
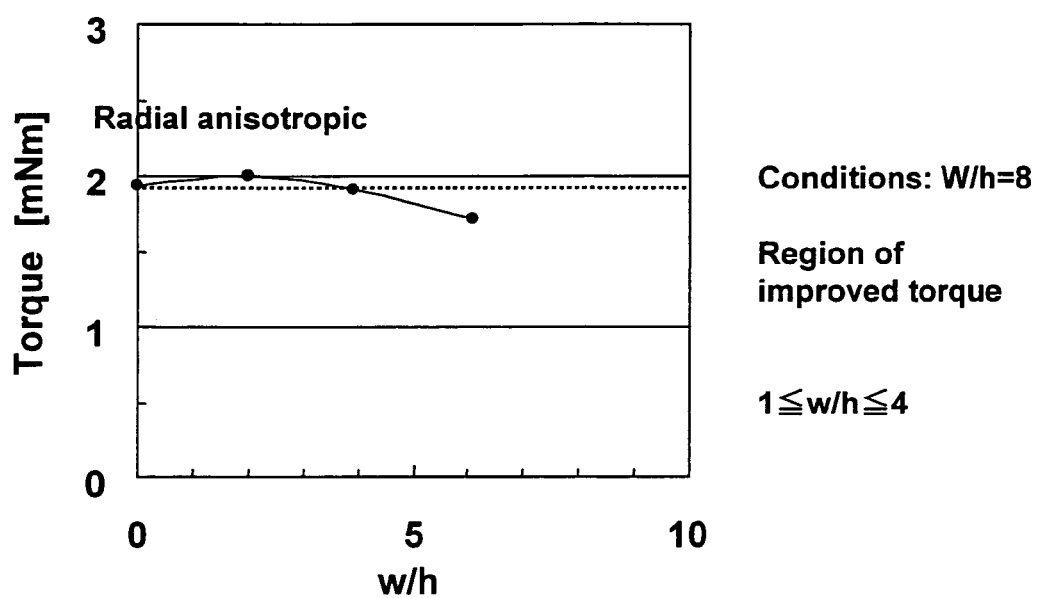
FIG. 17 is a characteristic lines view showing w/h relative to torque of the anisotropic rare earth bonded magnet for a specific embodiment of the present invention.

FIGS. 9 through 12 show that in comparison to the radially magnetized magnet of comparison example 1, in the ring magnet of both embodiments A and B the interface is polar anisotropically magnetized, and because in the center of the main pole magnetic flux density in the radial direction is increased, the waveform of surface magnetic flux is close to a sine wave and the gradient of magnetic flux change at the boundary of the magnetic pole is smooth. Therefore, in a motor using the ring magnet of embodiments A and B, a great decrease in the amount of cogging torque can be expected. In particular, main pole 11 possesses convex part 112 and is more thickly formed than other parts, and so in comparison to the ring magnet of embodiment A which is not formed in that manner, the surface magnetic flux distribution of the ring magnet in embodiment B is even closer to a sine wave. FIG. 13 shows the four magnet flux distributions of above-mentioned embodiment A, embodiment B, comparison example 1, and comparison example 2 layered together. Because the change in magnetic flux density at the interface is gentle for comparison example 2, it is effective for a decrease in cogging torque, but due to the fact that surface magnetic flux is greatly reduced at the main pole, torque as high as that of the motor using the ring magnet of the embodiments can not be obtained.

Also, when comparing waveforms, embodiment A and even more so embodiment B are closer to a sine wave, and surface magnetic flux is maximized at the center of the magnetic pole. Therefore, the magnetic field supplied by the stator also matches timing with a sine wave, and an improvement in motor output torque can be expected.

The ring magnets of present embodiments A and B are excellent in comparison to the conventional technology; surface magnetic flux of embodiment A is 290 mT, surface magnetic flux of embodiment B is 300 mT, surface magnetic flux of comparison example 1 is 225 mT, and surface magnetic flux of comparison example 2 is 225 mT.

Further, the total amount of magnetic flux was measured and compared for the radially magnetized magnet of embodiment B and comparison example 1. The measurement method involved using a flux meter to detect with a search coil the magnetic flux generated from the magnetic pole while rotating the ring magnet.

Thin hybrid magnet with yoke 1 of embodiment B, in which the magnet thickness is increased, with convex part 112 formed in main pole 11, in comparison to the radially magnetized magnet of comparison example 1, has about a 10% greater amount of magnetic flux. Therefore, when used in a brushless motor, higher torque can be anticipated.

On the other hand, to make the surface magnetic flux density of the ring magnet is a sine wave, it is good to have polar anisotropic alignment and magnetization across the entire magnetic pole, and therefore next is considered polar anisotropic alignment in the rare earth anisotropic bonded magnet. Because magnetic pole width of the polar anisotropically aligned and magnetized ring magnet, with the same material, diameter, and magnetic pole width W as the ring magnet in embodiment B, is 15.7 mm, the magnet thickness which is ordinarily ½ of the magnetic pole width needs to be about 8 mm, increasing wall thickness and thereby increasing motor size. In fact, a high performance magnet such as the above rare earth anisotropic bonded magnet has not been realized because the material has a high coercivity which requires a large aligning magnetic field, making it industrially difficult to polar anisotropically magnetize a thickness up to 8 mm. Magnetic flux passes through the part of the surface of the bonded magnet near the area between magnetic poles which are in the vicinity of the area between main poles, and because it is difficult for magnetic flux to penetrate just beneath the main pole, an adequate aligning magnetic field is not obtained in the center of the main pole. Therefore, anisotropy does not effectively function in this center part of the main pole, magnetic flux density decreases after magnetization, and therefore the magnet can not be used in practical application.

And, specifically, especially when using rare earth magnet powder, even in the case of a rare earth isotropic bonded magnet or rare earth anisotropic sintered magnet, when similarly polar anisotropically aligning the magnet, the thickness necessary for polar anisotropic alignment of the magnet is ½ of the pole width, so in comparison to the hybrid magnet of the present invention, surface magnetic flux per magnet unit volume is greatly reduced, and moreover expensive scarce resources can not be effectively used.

Figure 5:
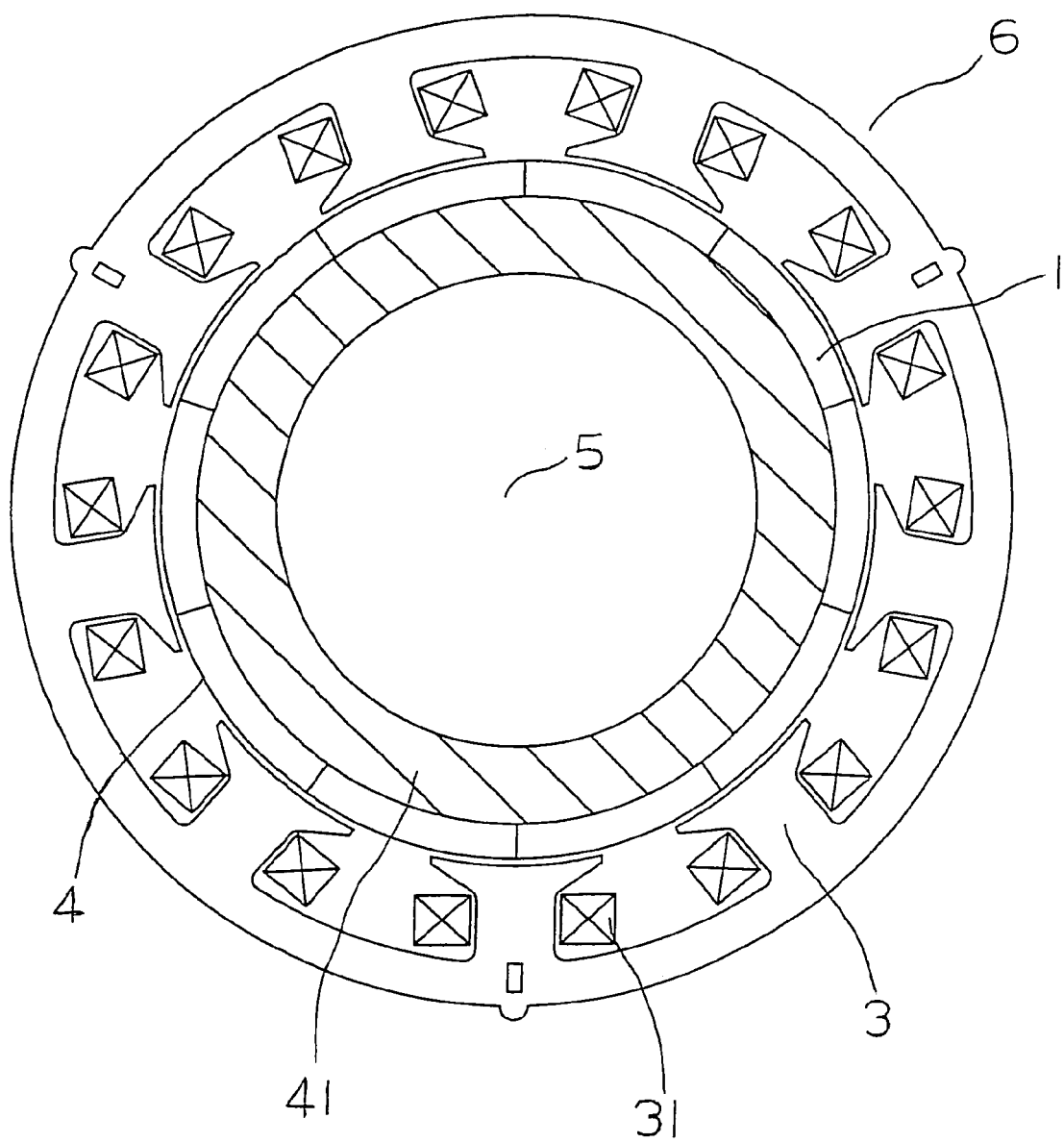
FIG. 5 is a cross sectional view of a brushless motor using the thin hybrid magnetized ring magnet of the present invention.

The above-mentioned hybrid magnet 1 is applied in a brushless motor. FIG. 5 is a cross sectional diagram of an inner rotor-type brushless motor with hybrid magnet 1 shown in FIG. 1 used in the inner rotor, in the direction perpendicular to rotational axis 5. Brushless motor 6 of the present embodiment is structured of rotational axis 5, rotor 4 arranged to freely rotate around rotational axis 5, stator 3, and coil 3 wound around stator 3. Rotor 4 is comprised of rotor core 41 and hybrid magnet 1 which is closely fit to the external periphery of rotor core 41. Stator 3 possesses nine teeth poles.

The relationship between the number of stator teeth poles and the magnetic poles of the rotor magnet is not limited to the above example; various publicly known combinations may be adopted depending on the usage environment and intended use.

When hybrid magnet 1 of the present invention is applied in the above brushless motor, abrupt change in magnetic flux at the interface between magnetic poles in the case of radial magnetization is made smooth by polar anisotropically magnetizing the interface. As a result, cogging torque of this embodiment is 5 mmN·m, versus 15 mmN·m when radially magnetizing; A 67% decrease in cogging torque can be attained. At the same time, by polar anisotropically magnetizing the interface between magnetic poles, there is an increase in the magnetic flux density of the radially aligned magnetized main pole, the surface magnetic flux distribution has a wave form near that of a sine wave, and in comparison to only radial alignment and magnetization, output torque can be increased by about 15%.

When other hybrid magnet 1A of the present invention is applied in the above brushless motor, cogging torque of this embodiment is 0.1 N·m, versus 0.31 mmN·m when radially magnetizing; a 67% decrease in cogging torque can be attained. Also, it is possible to make the output torque obtained when using a hybrid aligned magnet equal to the output torque obtained when using a radially aligned magnet.

At the same time, as stated earlier the magnet thickness necessary for polar anisotropic magnetization of the interface in this embodiment is 2.5 mm, and when all magnetic poles are formed by polar anisotropic magnetization to have the same width, with a magnet thickness of about 8 mm is necessary when the polar anisotropically aligning magnetic field is polar anisotropically magnetized in a semicircular shape, it is possible to form the magnetic poles at an extremely thin magnet thickness. Thus, in this embodiment, in comparison to a brushless motor using a polar anisotropically magnetized magnet, a great reduction in magnet size can be planned, and it is moreover possible to attain a reduction in size of the entire motor.

This thin hybrid magnet can be applied not only in brushless motors but in brush motors as well. Although it is ordinarily rare to use multiple magnetic poles in a brush motor, application of this technology is possible. Particularly, when the surface magnetic flux waveform is made into a sine wave, by eliminating an abrupt change in magnetic flux at the magnetic pole boundary, it is possible to reduce the induced voltage when switching magnetic poles, and because the induction voltage flowing to the brush is greatly reduced, with the result of lengthening the lifespan of the brush.

POSSIBILITY OF INDUSTRIAL USE

The present invention can be used for a ring magnet which decreases cogging torque and improves motor torque per unit volume of magnet. It is used for magnets used in brush motors and brushless motors used in electronic devices, magnets with attached yoke, and motors using those magnets.

The invention claimed is:

1. A thin hybrid magnetized ring magnet having a plurality of magnetic poles, comprising:

an anisotropic bonded magnet which is composed of anisotropic rare earth magnet powders and resin;

main pole areas in which said anisotropic rare earth magnet powders are radially aligned and radially magnetized; and an interface area being polar anisotropically aligned and polar anisotropically magnetized, said interface area existing between adjacent two of said main pole areas and varying a magnetization direction of said main pole area, wherein W/h is not less than 4 and not greater than 20, and w/h is not less than 1 and not greater than 4 when a thickness of said magnet is h, a width of each of said magnetic poles is W and a width of said interface area is w.

2. The thin hybrid magnetized ring magnet according to claim 1, wherein a thickness of said main pole is increased in a radial direction in comparison with said interface area.

3. A brushless motor, comprising:
said thin hybrid magnetized ring magnet according to claim 2.

4. The thin hybrid magnetized ring magnet according to claim 1, wherein in the ring magnet used in an inner rotor, when used in a motor, a thickness of a main pole area is increased only in a direction of an internal diameter in comparison with said interface area.

5. A brushless motor, comprising:
a cylindrical stator;
a rotor disposed inside said stator; and
a revolving axle,
wherein said rotor comprises a rotor core and said thin hybrid magnetized ring magnet according to claim 4, which closely fits to an outside peripheral surface of said rotor core.

6. The thin hybrid magnetized ring magnet according to claim 1, wherein in the ring magnet used in a rotor, when used in a motor, a thickness of said main pole area is increased only in a direction of an external diameter in comparison with said interface area.

7. A brushless motor, comprising:
a cylindrical rotor;
a stator disposed inside said rotor; and
a revolving axle,
wherein said rotor comprises a rotor yoke and said thin hybrid magnetized ring magnet according to claim 6, which closely fits to an inside peripheral surface of said rotor yoke.

8. A brushless motor comprising:
a cylindrical stator;
a rotor disposed inside the stator; and
a revolving axle,
wherein said rotor comprises a rotor core and said thin hybrid magnetized ring magnet according to claim 1, which closely fits to the outside peripheral surface of said rotor core.

9. The thin hybrid magnetized ring magnet according to claim 1, wherein W/h is not greater than 8.

10. A thin hybrid magnetized ring magnet according to claim 1, wherein said thin hybrid magnetized ring magnet comprises a yoke contacting at least part of either the internal face or external face of said thin hybrid magnetized ring magnet.

11. A brushless motor, comprising:
a cylindrical rotor;
a stator disposed inside said rotor; and
a revolving axle,
wherein said rotor comprises a rotor yoke and said thin hybrid magnetized ring magnet according to claim 1, which closely fits to the inside peripheral surface of said rotor yoke.

12. A brushless motor, comprising:
said thin hybrid magnetized ring magnet according to claim 1.

13. The thin hybrid magnetized ring magnet according to claim 1, wherein said anisotropic rare earth magnet powders comprise at least Nd.

* * * * *